(12) United States Patent
Yasukawa et al.

(10) Patent No.: US 10,492,120 B2
(45) Date of Patent: Nov. 26, 2019

(54) USER APPARATUS AND BASE STATION

(71) Applicant: NTT DOCOMO, INC., Tokyo (JP)

(72) Inventors: Shimpei Yasukawa, Tokyo (JP); Hiroki Harada, Tokyo (JP); Satoshi Nagata, Tokyo (JP); Qun Zhao, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/561,790

(22) PCT Filed: Mar. 29, 2016

(86) PCT No.: PCT/JP2016/060231
§ 371 (c)(1),
(2) Date: Sep. 26, 2017

(87) PCT Pub. No.: WO2016/159000
PCT Pub. Date: Oct. 6, 2016

(65) Prior Publication Data
US 2018/0084480 A1     Mar. 22, 2018

(30) Foreign Application Priority Data
Mar. 31, 2015 (JP) .................................. 2015-074186

(51) Int. Cl.
*H04W 40/22* (2009.01)
*H04W 76/10* (2018.01)
(Continued)

(52) U.S. Cl.
CPC ........... *H04W 40/22* (2013.01); *H04W 24/10* (2013.01); *H04W 72/02* (2013.01); *H04W 72/08* (2013.01);
(Continued)

(58) Field of Classification Search
CPC combination set(s) only.
See application file for complete search history.

(56) References Cited

U.S. PATENT DOCUMENTS

| 2011/0256828 A1 | 10/2011 | Hsu et al. |
| 2012/0127888 A1 | 5/2012 | Fujishima et al. |
| (Continued) | | |

FOREIGN PATENT DOCUMENTS

| EP | 2833694 A2 | 2/2015 |
| EP | 2833694 A3 | 4/2015 |
| (Continued) | | |

OTHER PUBLICATIONS

International Search Report issued in PCT/JP2016/060231 dated Jun. 21, 2016 (5 pages).
(Continued)

*Primary Examiner* — Yee F Lam
(74) *Attorney, Agent, or Firm* — Osha Liang LLP

(57) ABSTRACT

A user apparatus that is used in a mobile communication system that supports D2D communication, and that includes a capability for becoming a relay apparatus for relaying data communication between a remote user apparatus and a base station, including: a transmission unit configured to transmit a measurement resource that is used for the remote user apparatus to select a relay apparatus from among candidates of relay apparatuses, and a layer 2 address of the user apparatus; and a response unit configured to receive, from the remote user apparatus, an assignment request of an address for data communication by the relay, and to transmit information of the address to the remote user apparatus.

2 Claims, 22 Drawing Sheets

(51) Int. Cl.
| | |
|---|---|
| H04W 24/10 | (2009.01) |
| H04W 72/02 | (2009.01) |
| H04W 72/08 | (2009.01) |
| H04W 88/04 | (2009.01) |
| H04W 92/18 | (2009.01) |
| H04W 76/14 | (2018.01) |

(52) U.S. Cl.
CPC ........... *H04W 76/10* (2018.02); *H04W 76/14* (2018.02); *H04W 88/04* (2013.01); *H04W 92/18* (2013.01)

(56) References Cited

U.S. PATENT DOCUMENTS

| | | | |
|---|---|---|---|
| 2013/0331093 A1 | 12/2013 | Cho et al. | |
| 2014/0135019 A1* | 5/2014 | Jang | H04W 36/0016 455/437 |
| 2014/0171062 A1* | 6/2014 | Fallgren | H04W 40/22 455/422.1 |
| 2015/0029866 A1 | 1/2015 | Liao et al. | |
| 2016/0100353 A1* | 4/2016 | Gleixner | H04W 48/16 370/329 |
| 2016/0157254 A1* | 6/2016 | Novlan | H04W 76/14 370/329 |
| 2016/0212721 A1* | 7/2016 | Sheng | H04W 76/14 |
| 2016/0295624 A1* | 10/2016 | Novlan | H04W 76/14 |
| 2016/0302215 A1* | 10/2016 | Sorrentino | H04W 76/14 |
| 2016/0353478 A1* | 12/2016 | Kim | H04W 72/12 |
| 2017/0013628 A1* | 1/2017 | Kim | H04J 11/0026 |
| 2017/0251507 A1* | 8/2017 | Fodor | H04W 76/14 |
| 2017/0295601 A1* | 10/2017 | Kim | H04W 72/04 |

FOREIGN PATENT DOCUMENTS

| | | |
|---|---|---|
| JP | 2009-225125 A | 10/2009 |
| JP | 2014-175805 A | 9/2014 |
| JP | 2014-233012 A | 12/2014 |
| WO | 2010150417 A1 | 12/2010 |

OTHER PUBLICATIONS

Written Opinion of the International Searching Authority issued in PCT/JP2016/060231 dated Jun. 21, 2016 (3 pages).
3GPP TR 36.843 V12.0.1; "3rd Generation Partnership Project; Technical Specification Group Radio Access Network; Study on LTE Device to Device Proximity Services; Radio Aspects (Release 12)"; Mar. 2014 (50 pages).
3GPP TS 36.213 V12.4.0; "3rd Generation Partnership Project; Technical Specification Group Radio Access Network; Evolved Universal Terrestrial Radio Access (E-UTRA); Physical layer procedures (Release 12)"; Dec. 2014 (225 pages).
3GPP TS 23.303 V12.3.0; "3rd Generation Partnership Project; Technical Specification Group Services and System Aspects; Proximity-based services (ProSe); Stage 2 (Release 12)"; Dec. 2014 (62 pages).
3GPP TS 24.334 V12.1.1; "3rd Generation Partnership Project; Technical Specification Group Core Network and Terminals; Proximity-services (ProSe) User Equipment (UE) to ProSe function protocol aspects: Stage 3 (Release 12)"; Jan. 2015 (66 pages).
Office Action issued in corresponding Japanese Application No. 2017-510051, dated Aug. 7, 2018 (7 pages).
Extended European Search Report issued in the counterpart European Patent Application No. 16772881.5, dated Jun. 6, 2018 (12 pages).
Partial Supplementary European Search Report issued in the counterpart European Patent Application No. 16772881.5, dated Mar. 2, 2018 (15 pages).
Office Action issued in the counterpart Japanese Patent Application No. 2017-510051, dated Mar. 6, 2018 (5 pages).

* cited by examiner

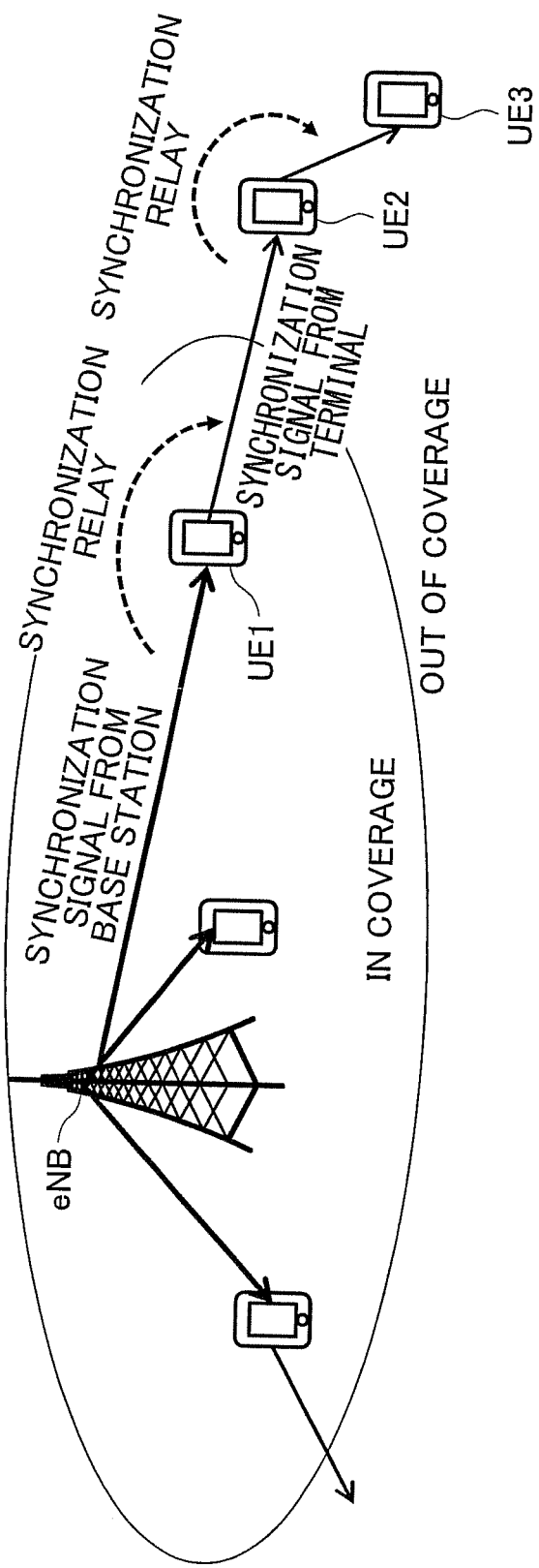

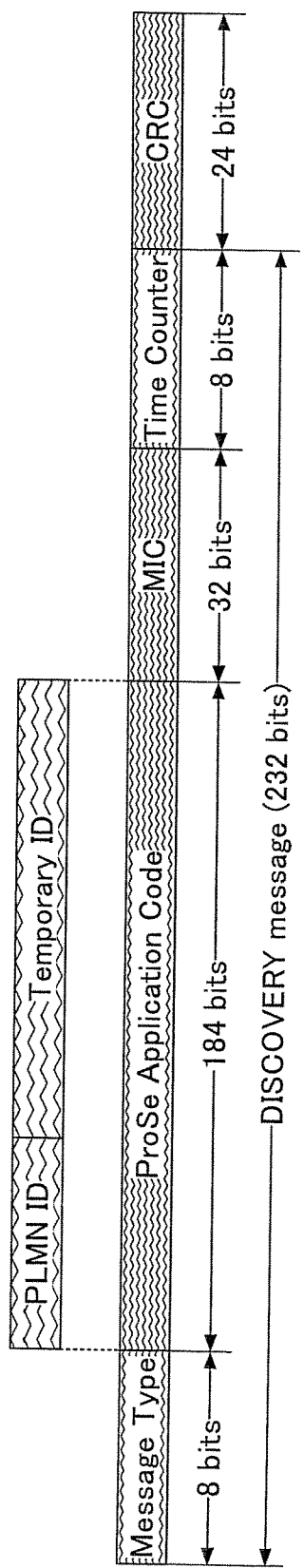

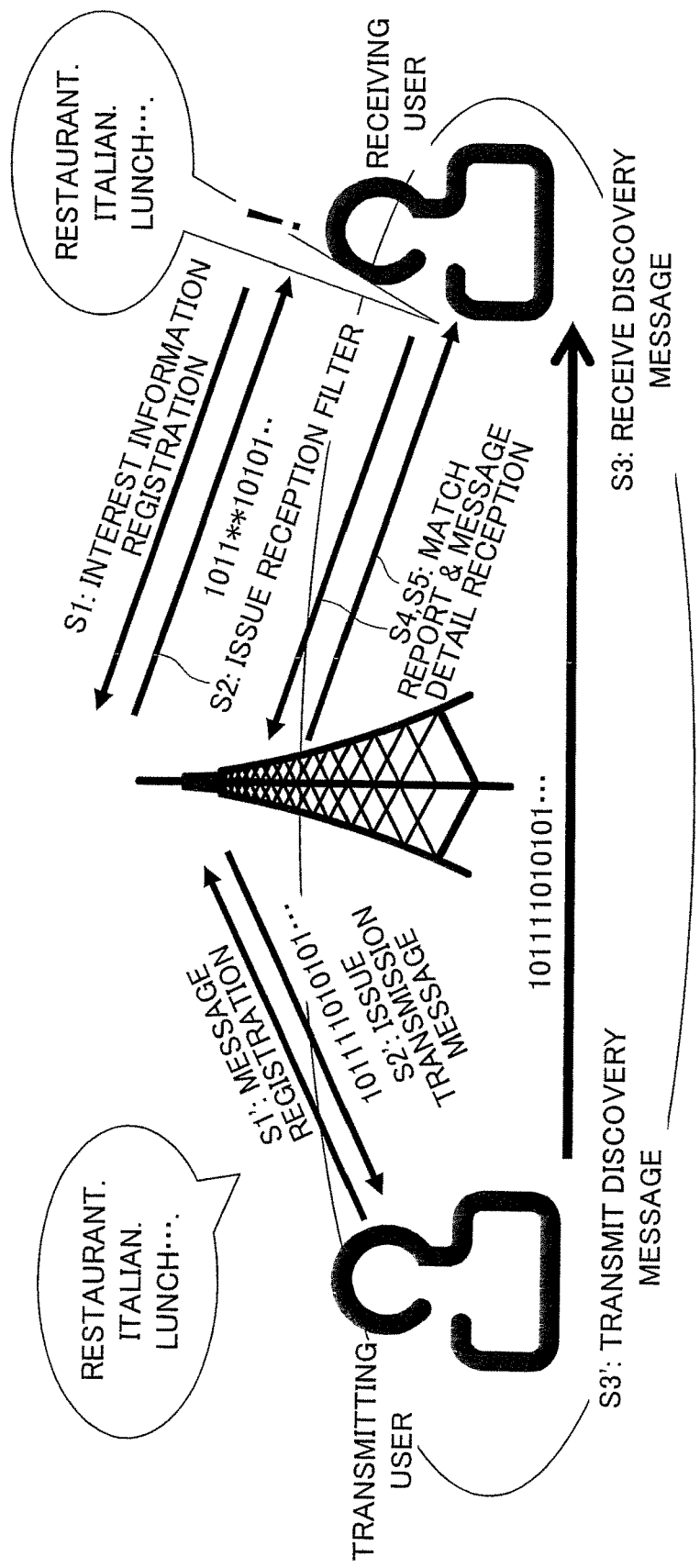

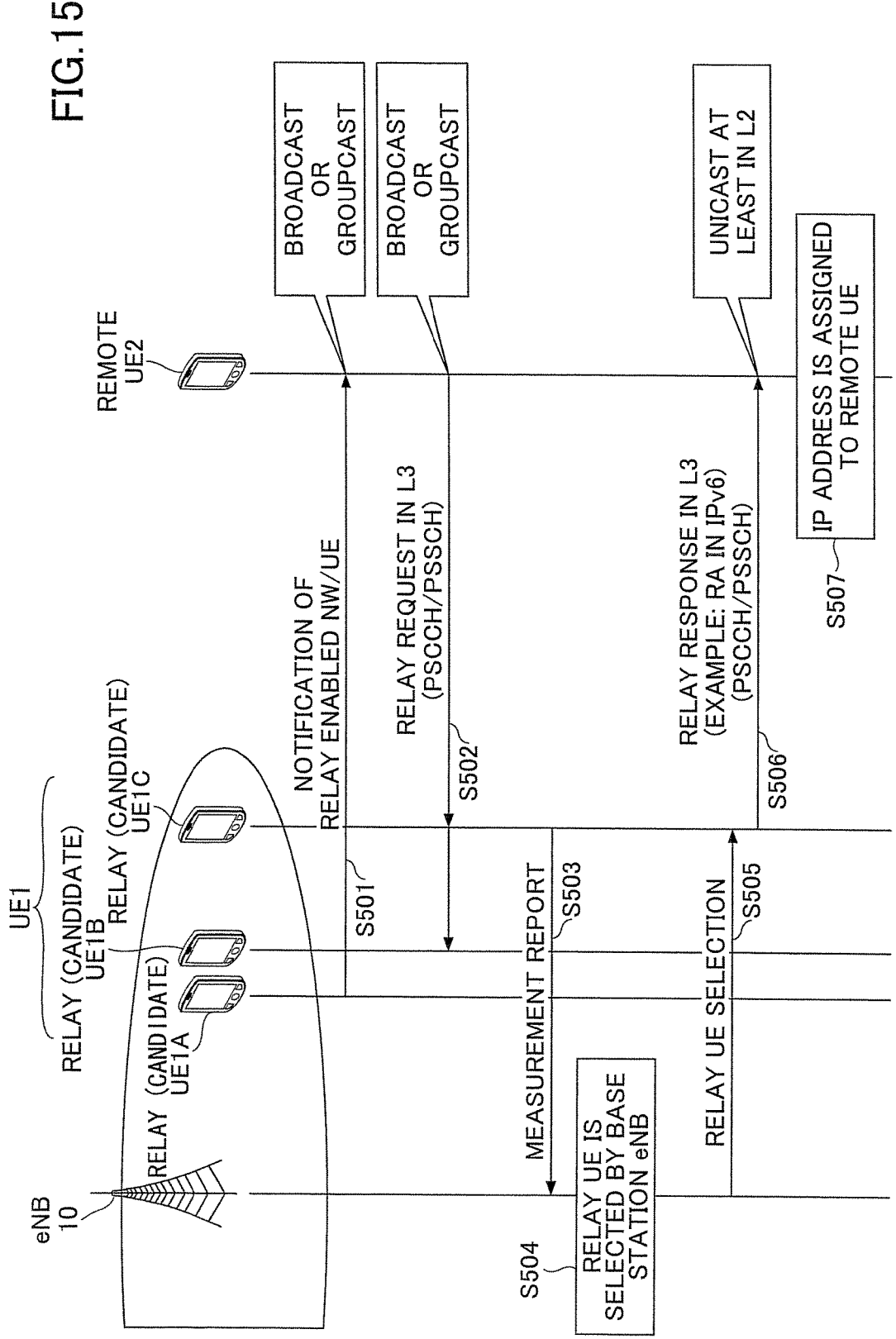

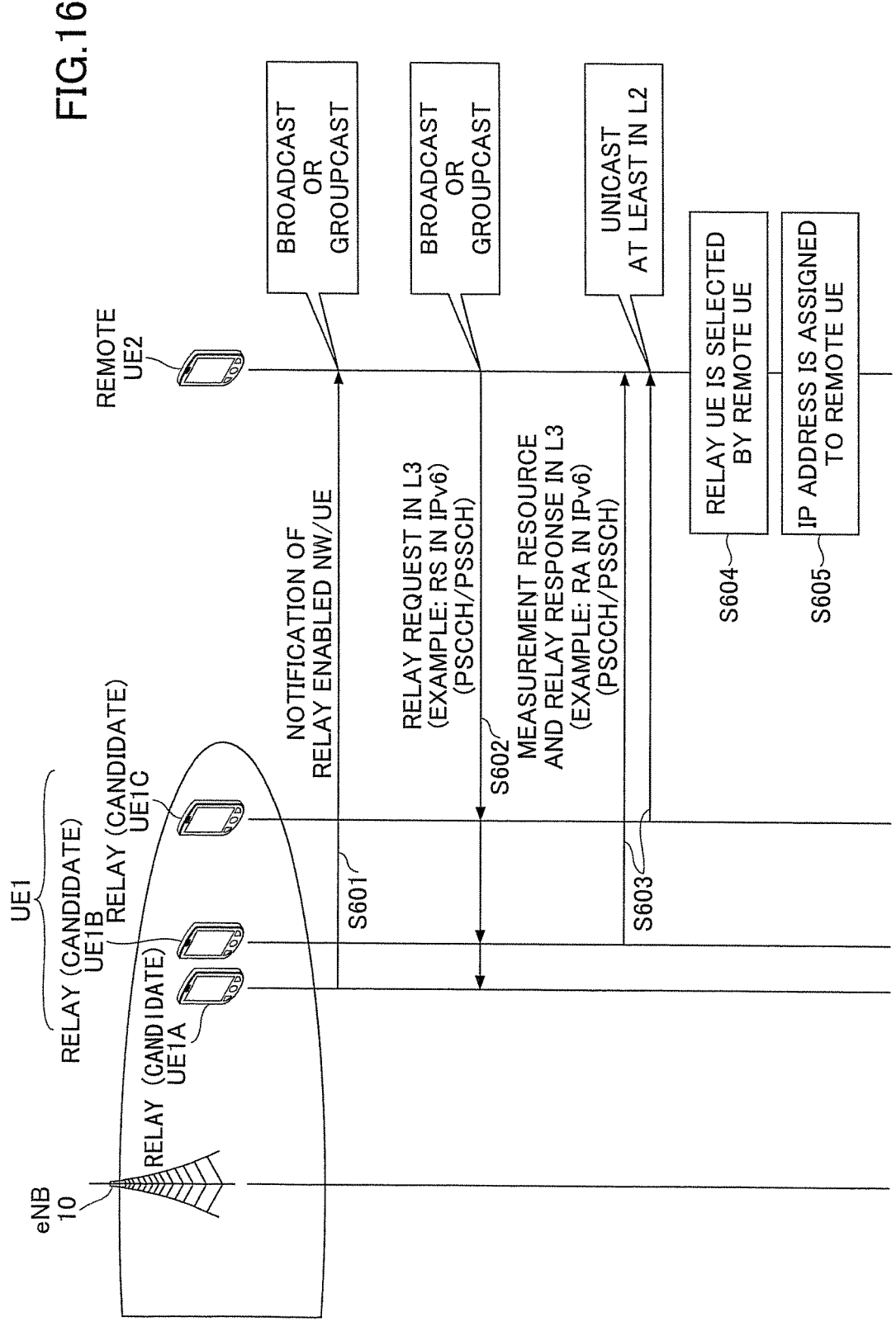

FIG.17A

| REQUEST FROM REMOTE UE | |
|---|---|
| L2 TRANSMISSION SOURCE ID | REMOTE UE |
| L2 TRANSMISSION DESTINATION ID | BROADCAST OR GROUPCAST |

FIG.17B

| RESPONSE FROM RELAY UE | |
|---|---|
| L2 TRANSMISSION SOURCE ID | RELAY UE |
| L2 TRANSMISSION DESTINATION ID | REMOTE UE |

USER APPARATUS AND BASE STATION

TECHNICAL FIELD

The present invention relates to D2D communication (user apparatus-to-user apparatus communication or device-to-device communication). More particularly, the present invention relates to a technique in which, in D2D communication, a UE that is out-of-cellular coverage utilizes a UE that is in-coverage as a relay apparatus (relay) so as to perform communication with a network.

BACKGROUND ART

In mobile communication systems such as LTE, it is common that a user apparatus UE and a base station eNB perform communication so that communication is performed between user apparatuses UE via the base station eNB and the like. However, in recent years, various techniques are proposed on D2D communication (to be referred to as D2D hereinafter) for performing direct communication between user apparatuses UE.

Especially, in D2D of LTE, there are proposed "Communication" for performing data communication such as push telephone call and the like between user apparatuses UE, and "Discovery" in which a user apparatus UE transmits a discovery message including an application ID and the like so as to cause a user apparatus UE of a receiving side to detect the user apparatus UE of the transmitting side (refer to non-patent document 1, for example).

In the D2D specified in LTE, each user apparatus UE uses a part of uplink resources already specified as transmission resources of an uplink signal from the user apparatus UE to the base station eNB. In the following, outline of signal transmission of D2D in LTE is described.

As to "Discovery", as shown in FIG. 1A, a resource pool for Discovery message is kept for each Discovery period, so that the user apparatus UE transmits a Discovery message in the resource pool. More particularly, there are Type1 and Type2b. In Type1, the user apparatus UE autonomously selects a transmission resource from the resource pool. In Type2b, a semi-static resource is assigned by an upper layer signaling (RRC signal, for example).

Also, as to "Communication", as shown in FIG. 1B, a resource pool for Control/Data transmission is periodically kept. A user apparatus in the transmission side notifies the reception side of resources for Data transmission and the like by SCI (Sidelink Control Information) using a resource selected from the Control resource pool, and transmits Data using a resource for Data transmission. As to "Communication", more particularly, there are Mode1 and Mode2. In Mode1, a resource is dynamically assigned by a (E)PDCCH transmitted from the base station eNB to the user apparatus UE. In Mode2, the user apparatus UE autonomously selects a transmission resource from a resource pool for Control/Data transmission. As to the resource pool, it may be notified by a SIB, or a pre-defined one is used.

In LTE, a channel used for "Discovery" is referred to as PSDCH (Physical Sidelink Discovery Channel), a channel for transmitting control information such as SCI in "Communication" is referred to as PSCCH (Physical Sidelink Control Channel), and a channel for transmitting data is referred to as PSSCH (Physical Sidelink Shared Channel) (non-patent document 2).

RELATED ART DOCUMENT

Non Patent Document

[NON PATENT DOCUMENT 1] 3GPP TR 36.843 V12.0.1 (2014-03)
[NON PATENT DOCUMENT 2] 3GPP TS 36.213 V12.4.0 (2014-12)
[NON PATENT DOCUMENT 3] 3GPP TS 23.303 V12.3.0 (2014-12)
[NON PATENT DOCUMENT 4] 3GPP TS 24.334 V12.1.1 (2015-01)

SUMMARY OF THE INVENTION

Problem to be Solved by the Invention

In D2D communication, when the user apparatus UE is in-coverage of the base station eNB, the user apparatus UE can perform D2D communication at a timing synchronized with a synchronization signal from the base station eNB based on D2D resource configuration information and the like received from the base station eNB.

On the other hand, when the user apparatus UE is located out-of-coverage, the user apparatus UE can autonomously perform D2D communication by using information preconfigured in the apparatus, and, in addition to that, there is proposed a technique that enables the user apparatus UE to perform operation synchronized with the in-coverage UE by performing relay of the synchronization signal. That is, in the example shown in FIG. 2, an in-coverage user apparatus UE1 transmits a synchronization signal to an out-of-coverage user apparatus UE2 based on a synchronization signal received from the base station eNB. Further, the synchronization signal can be also transmitted from a UE2 to a UE3.

To perform relay also for data in the same way as the relay of the synchronization signal is proposed as "ProSe UE-to-Network Relay" (non-patent document 3). In "ProSe UE-to-Network Relay", it is proposed that an in-coverage relay UE performs relay of UL/DL unicast traffic between an out-of-coverage remote UE and a network, and the like.

However, there is no conventional technique for efficiently performing relay initialization and/or relay UE selection when starting D2D relay. Concrete techniques necessary for realizing relay of data are required.

The present invention is contrived in view of the above-mentioned points, and an object of the present invention is to provide a technique that can efficiently realize D2D relay communication in which an in-coverage user apparatus relays data communication between a user apparatus and a base station.

Means for Solving the Problem

According to an embodiment of the present invention, there is provided a user apparatus that is used in a mobile communication system that supports D2D communication, and that includes a capability for becoming a relay apparatus for relaying data communication between a remote user apparatus and a base station, including:

a transmission unit configured to transmit a measurement resource that is used for the remote user apparatus to select a relay apparatus from among candidates of relay apparatuses, and a layer 2 address of the user apparatus; and a response unit configured to receive, from the remote user apparatus, an assignment request of an address for data communication by the relay, and to transmit information of the address to the remote user apparatus.

According to an embodiment of the present invention, there is provided a user apparatus that is used in a mobile communication system supporting D2D communication, and that includes a capability for becoming a relay apparatus for relaying data communication between a remote user apparatus and a base station, including:

a reception unit configured to receive, from the remote user apparatus, a relay request including a layer 2 address of the remote user apparatus;

a measurement unit configured to measure reception quality of a channel used for transmission of the relay request, and to transmit the reception quality to the base station as a measurement report; and a transmission unit configured to transmit, to the remote user apparatus, information of an address to be used for data communication by the relay in response to receiving information, from the base station, indicating that the user apparatus has been determined as a relay apparatus for the remote user apparatus.

According to an embodiment of the present invention, there is provided a user apparatus that is used in a mobile communication system supporting D2D communication, and that includes a capability for becoming a relay apparatus for relaying data communication between a remote user apparatus and a base station, including:

a reception unit configured to receive, from the remote user apparatus, a relay request including a layer 2 address of the remote user apparatus and an assignment request of an address for data communication by the relay; and a transmission unit configured to transmit, to the remote user apparatus, a measurement resource that is used for the remote user apparatus to select a relay apparatus from among candidates of relay apparatuses, and information of an address used for data communication by the relay.

According to an embodiment of the present invention, there is provided a base station that performs, in a mobile communication system supporting D2D communication, communication with a user apparatus that includes a capability for becoming a relay apparatus for relaying data communication between a remote user apparatus and a base station, including:

a reception unit configured to receive, from the user apparatus that measures reception quality of a channel received from the remote user apparatus, the reception quality as a measurement report; and a determination unit configured to determine a user apparatus as a relay apparatus for the remote user apparatus based on the measurement report, and to transmit information indicating that the determination has been made to the user apparatus.

Effect of the Present Invention

According to an embodiment of the present invention, there is provided a technique that can efficiently realize D2D relay communication in which an in-coverage user apparatus relays data communication between a user apparatus and a base station.

BRIEF DESCRIPTION OF THE DRAWINGS

FIG. 2 is a diagram showing synchronization relay;
FIG. 5 is a diagram showing an example of discovery message;
FIG. 6 is a diagram showing an example of communication using a discovery message;
FIG. 15 is a diagram showing a procedure example 2-1 for relay UE selection;
FIG. 16 is a diagram showing a procedure example 2-2 for relay UE selection;
FIG. 17A is a diagram showing an example of an ID included in relay request/relay response;
FIG. 17B is a diagram showing an example of an ID included in relay request/relay response.

EMBODIMENTS FOR CARRYING OUT THE INVENTION

In the following, an embodiment of the present invention is described with reference to figures. The embodiment described below is merely an example, and the embodiment to which the present invention is applied is not limited to the embodiment below. For example, although it is assumed that the mobile communication system of the present embodiment is a system of a scheme complying with LTE, the present invention is not limited to LTE, and other schemes can be applied. In the specification and the claims, the term "LTE" is used as having wide meaning including communication schemes corresponding to 3GPP releases 12 and 13, or communication schemes corresponding to 3GPP releases after these.

In the following, basically, a base station is described as "eNB", and a user apparatus is described as "UE". The eNB is an abbreviation of "evolved Node B", and the UE is an abbreviation of "User Equipment".

(System Configuration)

Figure 1A:
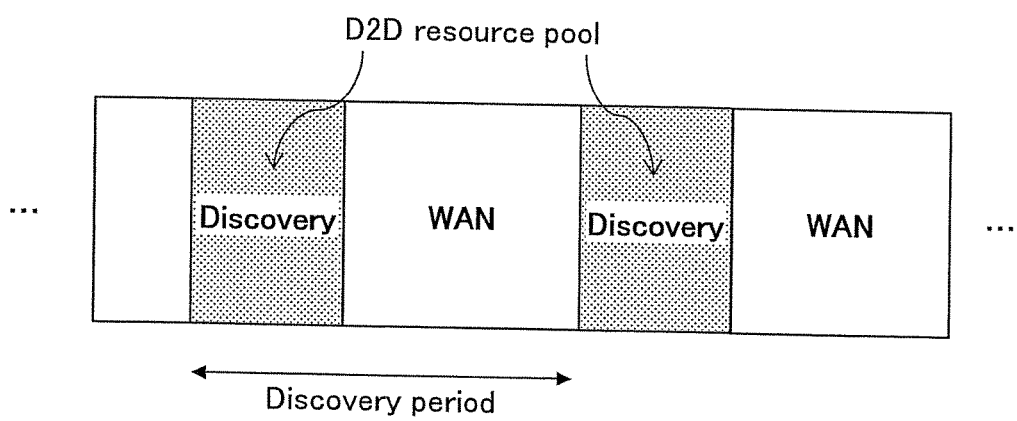
FIG. 1A is a diagram for explaining D2D communication.
Figure 1B:
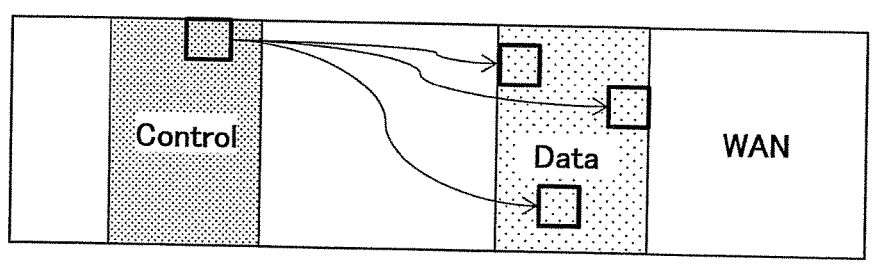
FIG. 1B is a diagram for explaining D2D communication.
Figure 3:
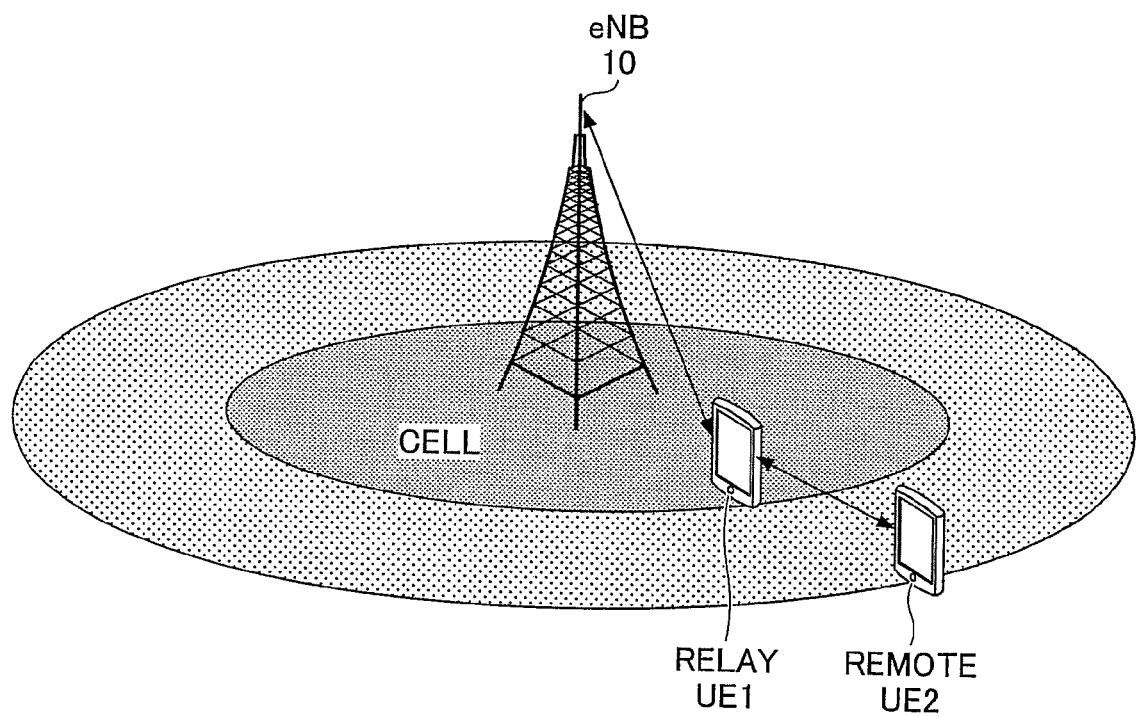
FIG. 3 is a block diagram of a communication system according to an embodiment of the present invention.

FIG. 3 shows a block diagram of a communication system according to an embodiment of the present invention. The communication system of the present embodiment is a cellular communication system in which a UE1 exists in a coverage (cell) of an eNB10. The in-coverage UE1 has a D2D communication function, and is able to perform D2D communication with another in-coverage UE. Also, the in-coverage UE1 can perform D2D communication with an out-of-coverage UE2. The out-of-coverage UE2 also has a D2D communication function, and can perform D2D communication with another UE. Further, the in-coverage UE1 can perform normal cellular communication with the eNB10.

The in-coverage UE1 includes a signal relay function, and it may be referred to as a relay UE1. Also, the out-of-coverage UE2 may be referred to as a remote UE2. The relay UE1 can relay a signal between the eNB10 and the remote UE2.

A link between the eNB10 and the relay UE1 is referred to as a backhaul link, and a link between the relay UE1 and the remote UE2 is referred to as an access link.

Although the present embodiment shows an example of a case where the backhaul is LTE, this is merely an example. For example, the backhaul may be a network of a cable, satellite and the like.

In the present embodiment, techniques for efficiently realizing D2D relay in the communication system like the above-mentioned one are described in detail. Before explaining the techniques, examples of D2D techniques which are presupposed are described.

(Structure and the Like of Channels Used in D2D Communication)

Transmission and reception of a signal in D2D communication are performed by using a part of uplink resources in cellular communication.

Figure 4A:
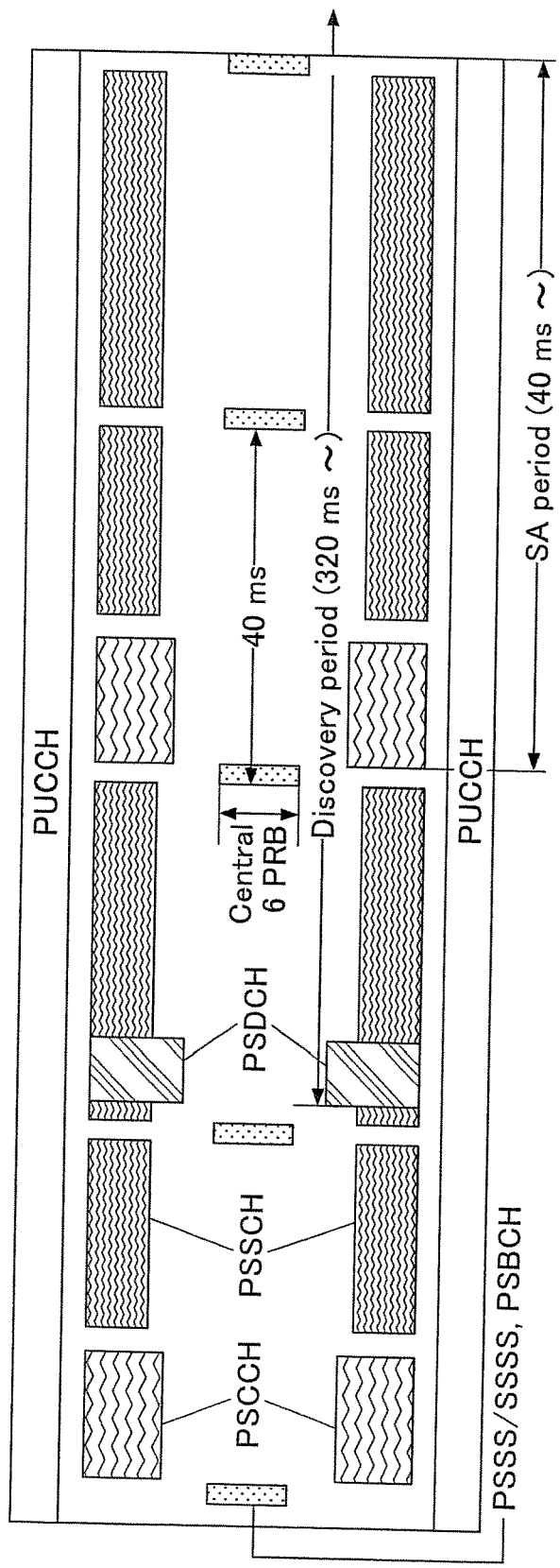
FIG. 4A is a diagram for explaining an example of a channel structure used in D2D communication.
Figure 4B:
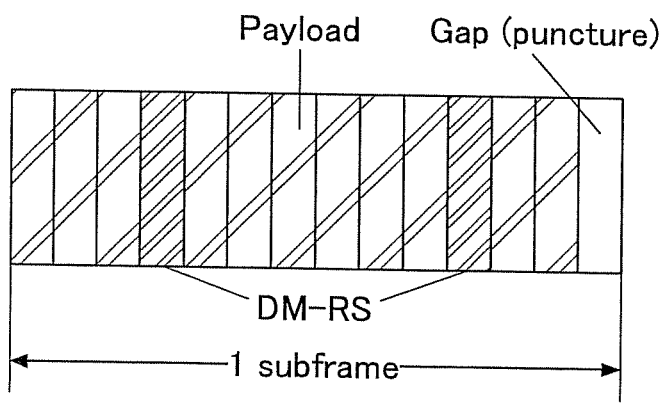
FIG. 4B is a diagram for explaining an example of a channel structure used in D2D communication.

Examples of channel structures of D2D communication are shown in FIGS. 4A and 4B. As shown in FIG. 4A, resource pools of PSCCH and resource pools of a PSSCH used for "communication" are assigned. Also, resource pools of PSDCH used for "discovery" are assigned with a period longer than a period of the channel of "communication".

Also, as synchronization signals for D2D, PSSS (Primary Sidelink Synchronization) and SSSS (Secondary Sidelink Synchronization) are used. Also, PSBCH (Physical Sidelink Broadcast Channel) is used for transmitting broadcast information such as D2D system band, frame number, resource configuration information and the like for out-of-coverage operation.

FIG. 4B shows a structure example of the PSCCH and the PSSCH. As shown in FIG. 4B, each of the PSCCH and the PSSCH has a structure similar to that of a PUSCH, and has a structure in which a predetermined number of DM-RSs (demodulation reference signals) are inserted in a payload.

FIG. 5 shows content of a discovery message that is transmitted by a PSDCH (non-patent document 4). As shown in FIG. 5, the discovery message includes a Message Type, a ProSe Application Code, a MIC (Message integrity check) and a Time Counter, in which a CRC is added. Also, the ProSe Application Code includes a PLMN ID and a Temporary ID.

An example of communication using a discovery message is described with reference to FIG. 6. A transmission user (UE) of a side desiring to be discovered performs registration of a message to a network (a server supporting D2D, and the like), first (step S1'). The transmission user receives a transmission message (ProSe Application Code) corresponding to the registered information from the network (step S2'). On the other hand, a reception user (UE) registers interested information to the network (step S1), and receives a reception filter from the network (step S2).

When a discovery message including the transmission message is transmitted from the transmission user (step S3'), the reception user receives the discovery message (step S3). If the transmission message matches the reception filter, the report is sent to the network (step S4), so that the reception user receives detailed information (step S5).

In a case where at least an out-of-coverage UE transmits a Discovery message, message issuing from the NW as described above cannot be performed, so that the UE autonomously configures content of the Discovery message. Also, in the case of a Discovery message for relay, there is a case where an in-coverage UE also uses autonomous message configuration instead of message issuing from the NW.

(Outline Example of Relay)

Figure 7:
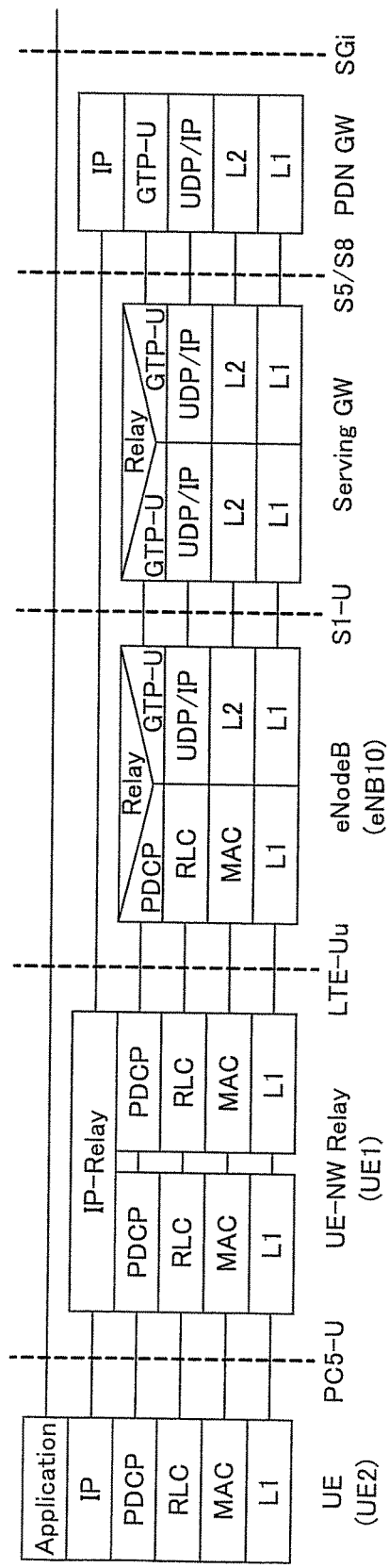
FIG. 7 is a diagram showing an example of a protocol of IP layer relay.

FIG. 7 shows an example of a protocol when performing D2D relay. In the example shown in FIG. 7, relay in the IP layer is performed. In the present embodiment, although relay of IP layer is performed as shown in FIG. 7, the layer of relay is not limited to IP, and relay may be performed by a layer lower than IP.

Figure 8:
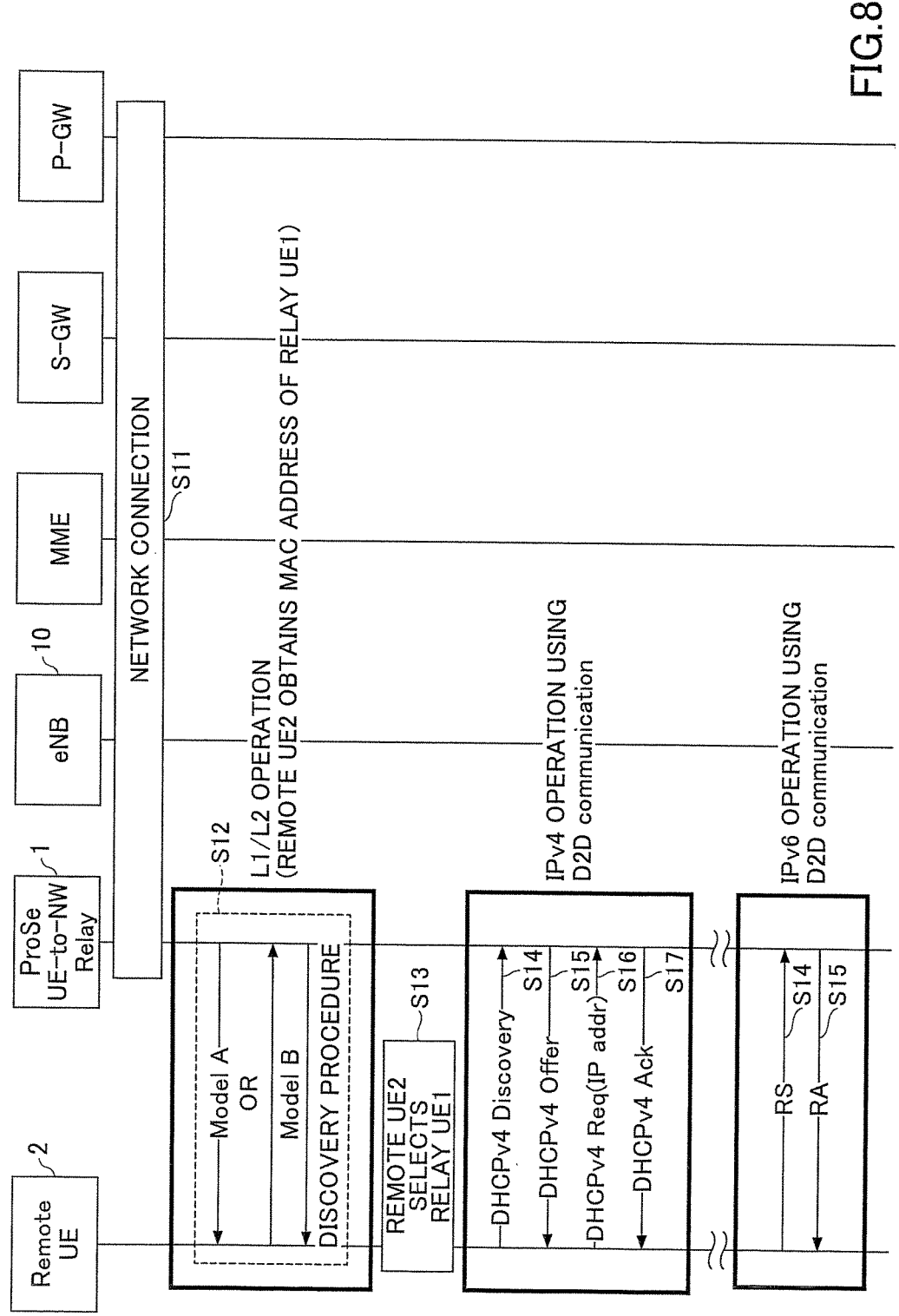
FIG. 8 is a diagram for explaining outline of relay initialization.

FIG. 8 is a diagram showing an example of relay initialization processing that is performed for starting relay communication by a protocol shown in FIG. 7 (non-patent document 3). Note that FIG. 8 is a diagram for explaining process examples for relay initialization (IP address assignment and the like) based on the technique described in the non-patent document 3 in order to facilitate understanding of process content in the embodiment of the present invention.

In step S11, the relay UE1 connects to a network (PDN: packet data network) to obtain information of an IP address. In step S12, a discovery procedure is performed. Here, the relay UE1 provides with information for assisting the relay UE2 to select the relay UE1. Model A shown in FIG. 8 is a Discovery method including announce (transmission side) and monitoring (reception side), and Model B is a Discovery method including request and response. In step S12, as operation of L1/L2, processing is performed in which the remote UE2 obtains a MAC address (which may be referred to as L2 address or L2 ID) of the relay UE1.

In step S13, the remote UE2 selects the relay UE1. When the IP address of the PDN to connect is IPv4, the remote UE2 designates the L2 address, and executes a procedure of DHCPv4 to obtain the IP address (steps S14~S17).

When the IP address of the PDN to connect is IPv6, the remote UE2 transmits a RS (Router Solicitation) message to the relay UE1 (the above-mentioned L2 address) (step S14). The relay UE1 that receives the RS message transmits a RA (Router Advertisement) message including an IPv6 prefix to the remote UE2 (step S15).

(Procedure Example of Relay Initialization According to the Present Embodiment)

Figure 9:
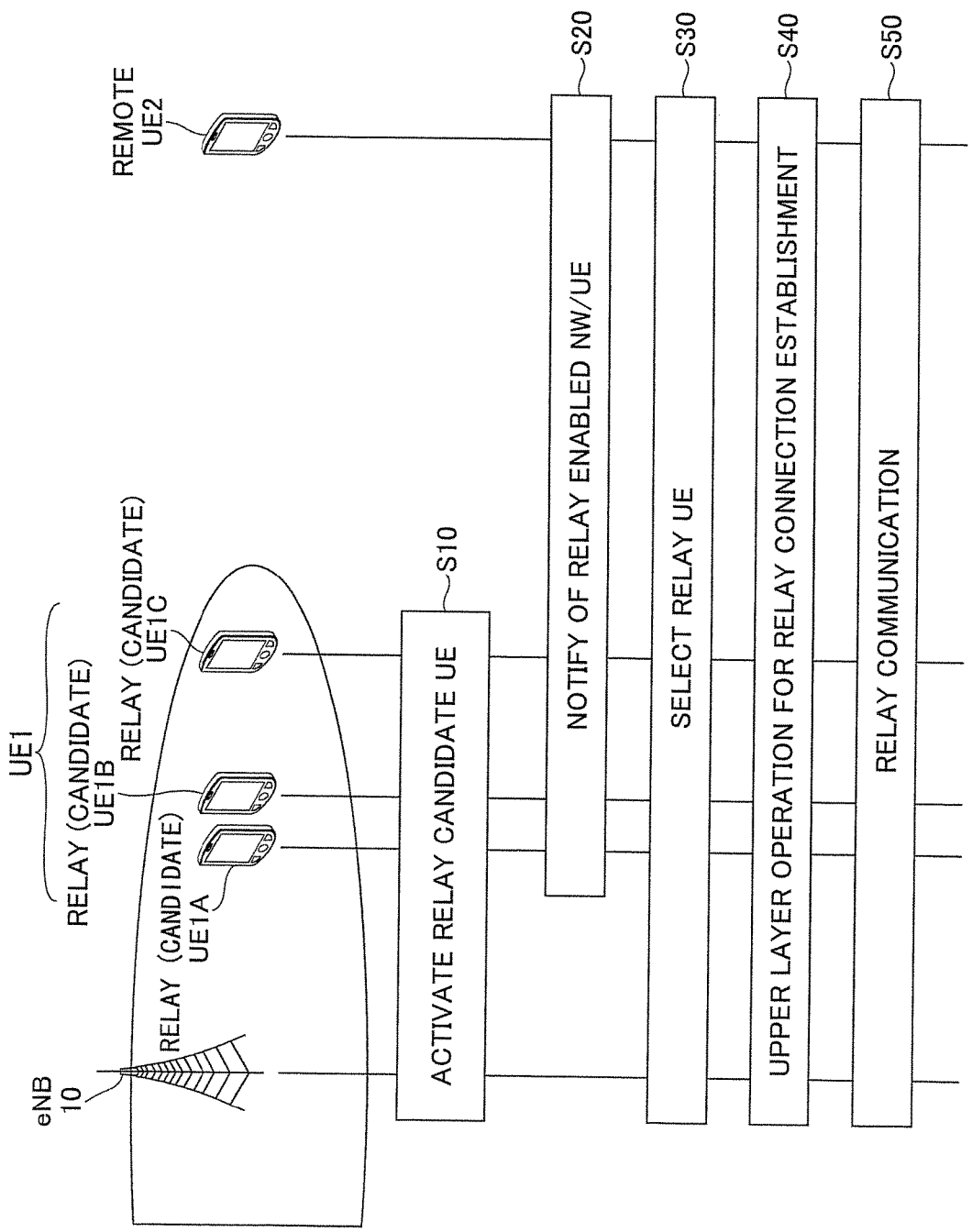
FIG. 9 is a diagram showing a procedure example for relay initialization.

FIG. 9 is a diagram showing a procedure example of relay initialization (processes for starting relay communication) according to the present embodiment. Outline of the procedure is described with reference to FIG. 9. Details will be described after that. The configuration of the communication system in the example of FIG. 9 is the same as that shown in FIG. 3. However, in the example of FIG. 9, a plurality of in-coverage UEs each of which may become a relay UE are shown. These are described as UE1A, UE1B, and UE1C. In the following, if 1A-1C are referred to without distinction, it is described as UE1. Also, in the present embodiment, basically, the UE1 cannot become a relay until it is activated, so that it can become a relay after activated. Therefore, basically, the UE1 after activated is referred to as a relay candidate, and a UE selected as a relay by a remote UE is referred to as a relay UE.

In step S10, the eNB10 activates the UE1. A UE that operates as a relay between the remote UE2 and the eNB10 is selected from among activated relay candidate UEs.

In step S20, a relay enabled NW/UE is notified from the relay candidate UE1 to the remote UE2. By this notification, the remote UE2 can ascertain that there is a UE that can operate as a relay in the network (eNB10) that supports a relay. The notification is performed, for example, by PSSS/SSSS, PSBCH or PSDCH.

In step S30, a relay UE is selected from among relay candidate UEs. For selection of a relay UE, for example, a request is transmitted from the remote UE2 to the relay candidate UE1, a signal (measurement resource) is transmitted from the relay candidate UE1 to the remote UE2 based on the request, and the remote UE2 performs quality measurement of a signal transmitted by the measurement resource so as to select a UE as a relay UE. In the following, there is a case where "measurement resource" is used as a signal transmitted by the resource.

After that, in step S40, connection processing of upper layer is performed, and relay communication is performed in step S50. In the following, examples of processes of steps S10~S30 are described in detail.

(Activation of UE)

Figure 10:
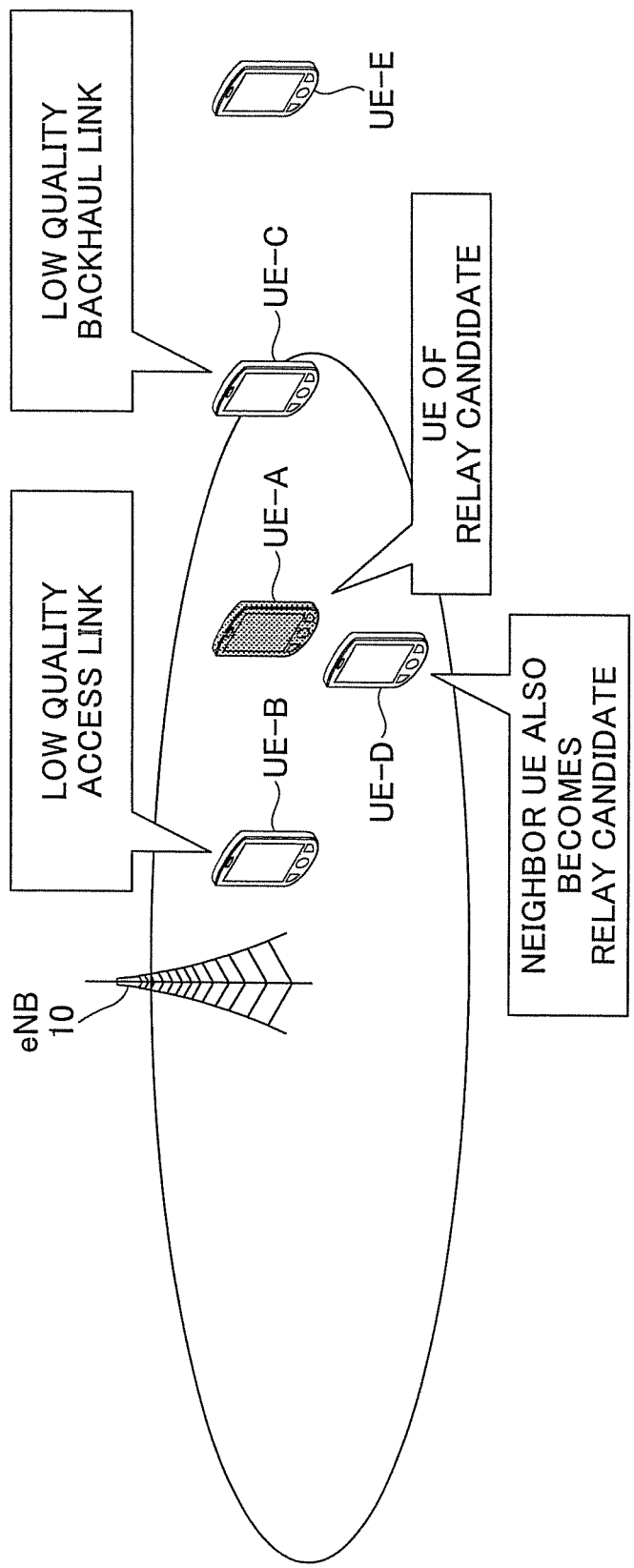
FIG. 10 is a diagram for explaining necessity of activation of a relay candidate UE.

Not every in-coverage UE is suitable for D2D relay for NW coverage extension. For example, the UE-B of in-coverage UEs shown in FIG. 10 is near the eNB10, so it can be considered that quality of the access link is low, the UE-C is near a cell edge, so it can be considered that the quality of the backhaul link is low. Thus, it can be considered that both of them are not suitable for D2D relay. Also, a UE that does not have a capability for performing relay cannot become a relay UE.

Also, in a situation where the UE-A shown in FIG. 10 operates as a relay candidate, and in addition to that, the neighboring UE-D also operates as a relay candidate and so on, that is, when density of relay candidate UEs becomes high, it can be considered that power consumption becomes large due to increase of interference, signal transmission and reception between relay candidate UEs, and the like.

Thus, in the present embodiment, only a proper in-coverage UE is caused to activate and operate as a relay candidate UE.

Figure 11:
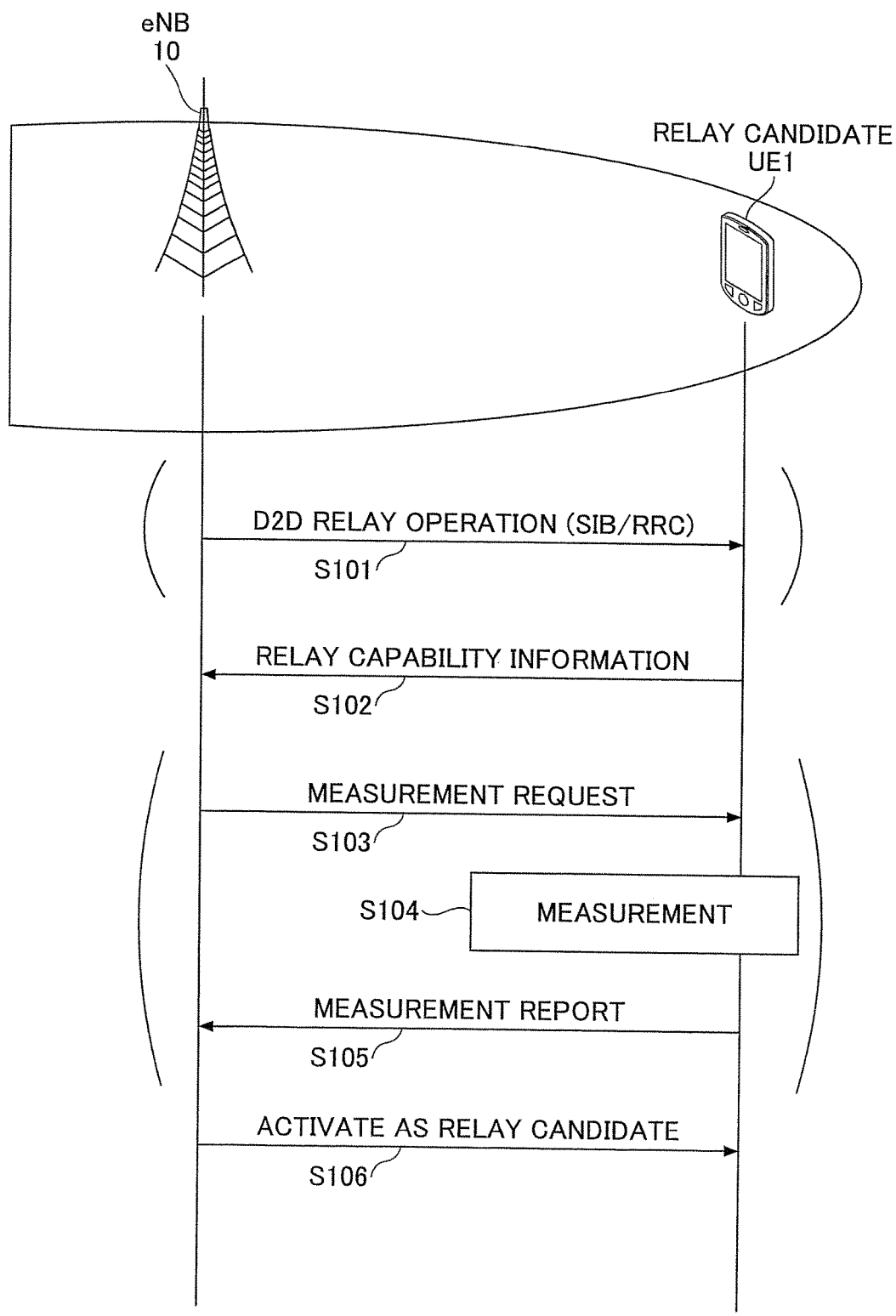
FIG. 11 is a diagram showing a procedure example for activation of a relay candidate UE.

A procedure example for activating a UE is described with reference to FIG. 11. In this procedure example, the eNB10 determines a UE of a relay candidate based on a UE capability and a measurement report, and activates the UE. In FIG. 11, each step in parentheses is optional, showing a step that may not be performed. In FIG. 11, only the UE1 is shown as a UE. However, it is shown as a representative, and actually, the UE1 is selected from among a plurality of UEs, and activation processing is performed.

In step S101, the eNB10 notifies of information (SIB, RRC or the like) indicating D2D relay operation. This signaling includes information indicating that the network supports relay or indicating to cause the UE to report relay capability.

In step S102, the UE1 transmits capability information on D2D relay to the eNB10. In a case where broadcasting of system information of step S101 is performed, the UE1 can notify of capability information on D2D relay based on reception of the system information (information indicating that NW supports D2D relay).

In step S103, the eNB10 sends a measurement request to the UE1. For example, it may be performed by an RRC signal or may be performed by a MAC signal. The UE1 performs measurement based on the measurement request (step S104). In step S104, the UE1 performs measurement of reception power/reception quality (RSRP/RSRQ) and the like in cellular, and measurers a signal (DM-RS of PSDCH, PSCCH, PSSCH and the like) transmitted from another activated relay candidate UE so as to detect a neighbor activated relay candidate UE.

The result of measurement in step S104 is reported from the UE1 to the eNB10 as a measurement report. The measurement report includes, for example, reception power/reception quality (RSRP/RSRQ) of a backhaul link, and the number of relay candidate UEs, whose reception level is equal to or greater than a certain value, that exist in the neighborhood of the UE1 and/or the reception level and the like.

The eNB10 determines a UE to activate as a relay candidate based on the measurement report and UE capability information received from each of UEs including the UE1, and activates the determined UE (step S106).

For example, based on the reception power/reception quality, the eNB10 determines a UE, as a UE to activate as a relay candidate, that has proper backhaul link quality, and for which the number of relay candidate UEs in the neighborhood is equal to or less than a predetermined threshold.

An activated relay candidate UE may also perform measurement of step 104 and the measurement report of step 105, so that, when the activated relay candidate UE becomes not satisfying a condition for activation, the eNB10 can deactivate the UE based on the measurement report.

Activation/deactivation for a UE can be performed by an upper layer signaling from the eNB10 to the UE. As the signaling, for example, an RRC signal or a MAC signal can be used. Also, resource information for relay initialization may be notified from the eNB10 to the UE1 in the activation signaling or at other timing (example: step S101). The resource information for relay initialization is, for example, information of a measurement resource to be transmitted to a remote UE in relay initialization, information to be included in PSBCH, and the like. It can be considered that reception of a relay request is available even in RRC_IDLE or in DRX. Thus, by providing a timer for activation, an active state may be kept even when the UE enters RRC_IDLE or DRX until the timer expires. Alternatively, by limiting the active state to RRC_CONNECTED, occurrence of delay due to RRC connection establishment for relay connection may be avoided. These operations may be switched by a signaling from the eNB, or one of them may be specified as terminal operation.

Also, for example, when an activated remote candidate UE detects quality deterioration of a backhaul link, or when terminal battery remaining amount becomes small, the activated remote candidate UE may autonomously deactivate itself. And, when there is an RRC connection, the activated remote candidate UE may report it to the eNB.

Steps S103~S105 may not be performed. In this case, for example, the eNB10 performs activation such that a predetermined ratio of UEs of UEs having relay capability become relay candidates.

(D2D Relay Enabled Notification)

Next, processing including performing relay enabled notification (Indication of relay enabled NW/UE) indicating that a UE is D2D relay enabled is described with reference to FIG. 12.

Figure 12:
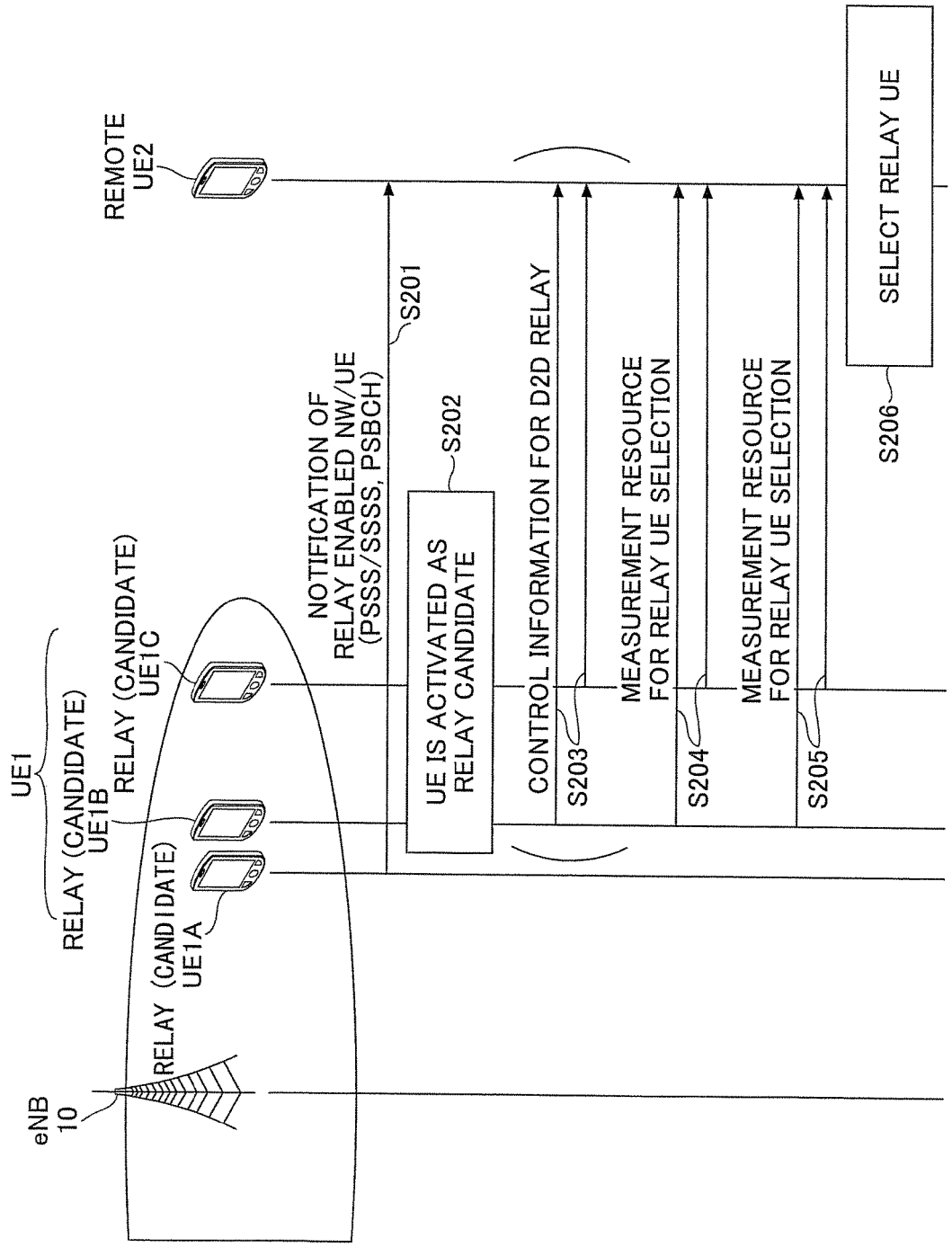
FIG. 12 is a diagram showing a procedure example including notification of relay enabled NW/UE.

As shown in FIG. 12, the UE1 transmits a PSSS/SSSS and a PSBCH (step S201). An out-of-coverage remote UE2 establishes timing synchronization and frequency synchronization with the in-coverage UE1 by the PSSS/SSSS. Also, the remote UE2 ascertains frame number (DFN) and the like by the PSBCH.

The PSBCH includes "In-coverage indicator" indicating whether the transmission side is in-coverage or out-of-coverage. In the present embodiment, for example, it may be defined that, when the bit of "In-coverage indicator" is a bit indicating being in-coverage, it indicates that the transmission side UE1 is relay enabled.

Also, the PSBCH includes "Reserved field" (example: 19 bits). For example, the transmission side UE1 that is relay enabled (having relay capability, and the network supports relay, and the like) may include information (bit) indicating that it is relay enabled in the "Reserved field" to transmit the PSBCH, so that the remote UE2 that receives the PSBCH may determine that there is a relay enabled UE1 when there is information indicating relay enabled in "Reserved field". Also, in a case where after-mentioned control information for D2D relay (D2D relay specific control information) is transmitted, "Reserved field" may include configuration information of a resource pool for transmitting (for the remote UE2 to receive) control information for D2D relay.

In the present embodiment, the relay enabled notification using the PSBCH is transmitted irrespective of whether the UE1 is activated as a relay candidate or not. FIG. 12 shows that a relay enabled notification is transmitted from the UE1 before being activated. However, only an activated UE may transmit a relay enabled notification.

In step S202, the UE1B and the UE1C are activated as relay candidates. In the following, in the description of FIG. 12, UE1 indicates the UE1B or the UE1C.

In step S203, the UE1 transmits (broadcasts) control information for D2D relay (D2D relay specific control information) to the remote UE2 side. The control information for D2D relay includes information for transmitting (receiving) a D2D channel (example: measurement resource) that is used by the remote UE2 for selecting a relay UE. Configuration information (resource pool and the like) for D2D transmission and reception used in steps S40 and S50 in FIG. 9 may be notified. For example, the control information for D2D relay is periodically transmitted such that an out-of-coverage UE can receive it arbitrarily.

Since relay enabled notification is possible also by using a D2D SIB (control information for D2D relay), the PSBCH may be used only as a trigger for receiving a D2D SIB. In a case where the PSBCH is used as a relay enabled notification, when an out-of-coverage UE cannot receive a D2D SIB, the out-of-coverage UE may perform relay request to an in-coverage UE by Relay Discovery of Model B by using a preconfigured parameter.

The control information for D2D relay can be transmitted by a PSDCH, for example, by using a field of ProSe Application Code in the PSDCH (Discovery message). For example, a required number of bits for configuration information notification is decreased by restricting variations of resource pools for transmitting the PSDCH, so that configuration information (configuration) of the PSDCH resource is notified by the PSBCH in step S201.

Also, for example, when an information amount of the control information for D2D relay is small, the control information for D2D relay may be transmitted by a PSBCH in step S201. In this case, transmission of step S203 is unnecessary.

After that, a measurement resource is transmitted from the UE1 to the remote UE2 side for relay UE selection (steps S204 and S205). The measurement resource corresponds to information of a resource indicated in the control information for D2D relay transmitted in step S202 and the like. The remote UE2 that receives the signal measures reception quality (RSRP, RSRQ and the like) of a signal received by the measurement resource, and for example, the remote UE2 selects a UE of the best reception quality as a relay UE (step S206). Also, the measurement resource is transmitted by, for example, PSDCH or PSCCH/PSSCH. As shown in FIG. 4A, these channels are periodically transmitted.

As described in step S104 of FIG. 11, an in-coverage UE performs detection of an activated neighbor relay candidate. As a resource for monitoring (measuring) for this detection, for example, a DM-RS of a channel in a part of periods of channels that the remote candidate UE periodically transmits in steps S204 and S205 and the like of FIG. 12 can be used.

The relay candidate UE1 may perform detection of the neighbor relay candidate UE (receiving the above-mentioned DM-RS) preferentially over D2D transmission. However, detection of the neighbor relay candidate UE is not given priority over transmission of PSSS/SSSS, PSBCH (and control information for D2D relay) and a measurement resource.

As already described, the control information for D2D relay and/or PSBCH include(s) configuration information and the like for the remote UE2 to receive a D2D channel (measurement resource) used for relay UE selection. More specifically, the control information for D2D relay and/or PSBCH include(s), as content, for example, resource pool configuration, CP length information, and DM-RS configuration. The content is, for example, configured from the eNB10 to the in-coverage UE1 by an upper layer signaling. Therefore, a Rel-12 UE can also transmit a relay enabled notification using a PSBCH.

The control information for D2D relay and/or PSBCH may further include an operator ID (example: PLMN, APN). Accordingly, the remote UE2 can determine availability of network accessing beforehand. By using an ID based on an operator ID as a destination ID, an operator ID may be implicitly notified. Also, the control information for D2D relay and/or PSBCH may include an L2 group destination ID. Accordingly, the remote UE2 can transmit a relay request to a relay candidate UE by a multicast designating the group. Also, the control information for D2D relay and/or PSBCH may include a security related parameter such as a security key and the like.

Note that, control information for D2D relay like the above-mentioned one may be preconfigured in each UE so that the control information for D2D relay may not be transmitted to the remote UE2.

As described above, the activated UE operates as a relay candidate, and an in-coverage UE transmits a relay enabled notification to a remote UE, so that useless processes are decreased and it becomes possible to start relay communication efficiently.

(Selection of Relay UE)

Next, an example of processing is described in which a remote UE2 and the like selects a relay UE used as a relay from among relay candidate UEs is described. That is, in the following, process content related to transmission of the measurement resource and relay UE selection shown in FIG. 12 are described in detail. The process content described in the following corresponds to processes performed after activation control and transmission of control information for D2D relay described so far. However, the process content described below is not limited to presupposing activation control and transmission of control information for D2D relay described so far, and can be performed independently.

In the present embodiment, process content is designed to enable reduction of signal transmission and reception, and overhead for relay UE selection and IP address assignment and the like, so that it becomes possible to start relay communication efficiently.

More specifically, a procedure (Joint transmission) for transmitting a measurement resource and an L2 address of UE (which may be referred to as L2 ID) collectively (simultaneously) is described as a procedure example 1 (including procedure example 1-1 and procedure example 1-2). In the procedure example 1, relay UE selection and IP address assignment in L2 are separated procedures.

Also, a procedure (Cross layer relay request) for performing relay request collectively for L2 and L3 (IP) is described as a procedure example 2 (including a procedure example 2-1 and a procedure example 2-2).

(On Measurement Resource: Common to Procedure Example 1 and Procedure Example 2)

The measurement resource to be used for the procedure example 1 and the procedure example 2 is a DM-SR in PSDCH or PSCCH/PSSCH, or a SRS (Sounding Reference Signal) newly transmitted in any channel.

In the present embodiment, the PSSCH as a measurement resource includes a transmission source/destination L2 address, and other data indicating that the resource of the PSSCH is a measurement resource for D2D relay. Therefore, when communication (PSCCH/PSSCH) is used for measurement, the remote UE2 holds a measurement result in a buffer (storage unit) until associated content of the PSSCH is decoded. By the decoded content, for example, the remote UE2 can ascertain a UE of a transmission source that transmits the measurement resource for relay UE selection.

When a relay UE or a remote UE transmits a measurement resource based on a request from a remote UE or a relay UE, the UE can transmit the measurement resource by a unicast or by a groupcast. Accordingly, the relay UE/remote UE can avoid unnecessary response from a UE other than the remote UE/relay UE that transmits the request.

In a case where transmission of a measurement resource based on a request as mentioned above is not performed, the measurement resource is transmitted by a broadcast except for a case where a groupcast destination ID is notified by control information for D2D relay.

A UE functioning as a relay UE can provide a plurality of remote UEs with a relay function. If the number of remote UEs that the relay UE accommodates reaches a limit of the terminal capability, any more remote UE cannot be accommodated. Therefore, the relay UE can transmit a measurement resource by a unicast or a groupcast such that only an accommodated remote UE performs measurement. Alternatively, it may be indicated that addition of remote UE is unavailable by using a payload of a measurement resource, or transmission of a measurement resource may be stopped. Also, for example, when the accommodated number has not reached the limit, the measurement resource is transmitted by a broadcast.

In the following, each procedure example is described. In each example in the following, it is assumed that the UE1 (UE1A, UE1B, UE1C) is activated. However, processing of activation/deactivation may not be presupposed. For example, the UE1 may start operation as a relay candidate when a condition (example: reception quality from eNB10) is satisfied.

Procedure Example 1-1

Figure 13:
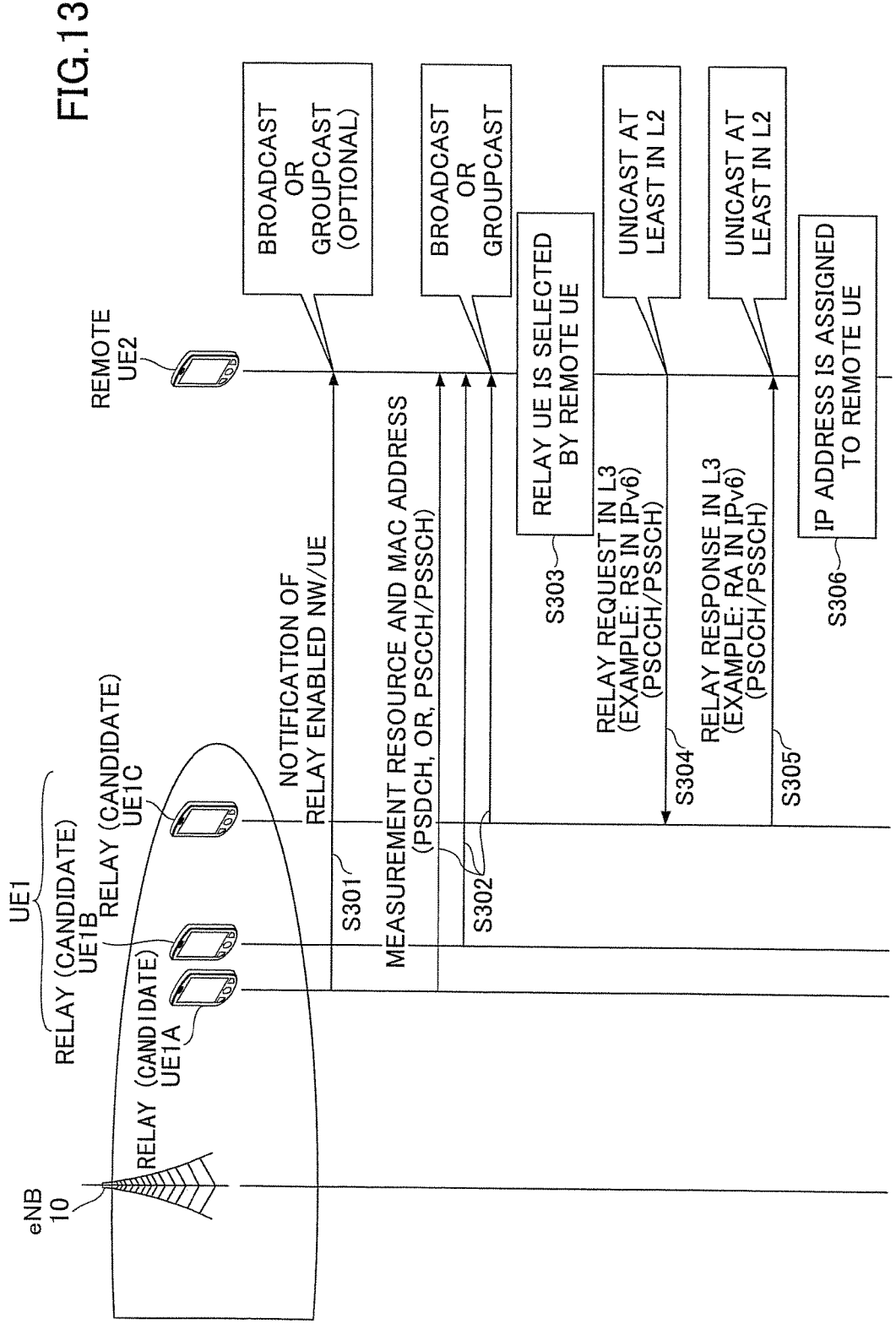
FIG. 13 is a diagram showing a procedure example 1-1 for relay UE selection.

The procedure example 1-1 is described with reference to FIG. 13. First, the UE1 transmits a relay enabled notification by a broadcast or a groupcast (in the case of control information for D2D relay using PSDCH or PSCCH/PSSCH). When using the groupcast, a group ID to be used for this notification is preconfigured in the terminal, or the group ID is notified explicitly or implicitly by a PSSS/SSSS and a PSBCH. The notification includes, for example, configuration information of a measurement resource to be transmitted after that (step S301). However, when the remote UE2 has the configuration information of the measurement resource beforehand, step S301 is unnecessary. Same applies to other procedure examples.

In step S302, the UE1 transmits a measurement resource and a MAC address (which may be referred to as L2 address, L2 ID) of the UE1 itself by a PSDCH or a PSCCH/PSSCH by a broadcast or a groupcast. When using the groupcast, a group ID to be used for this notification is preconfigured in the terminal, or the group ID is notified explicitly or implicitly by a PSSS/SSSS and a PSBCH. Each of the PSDCH and the PSCCH/PSSCH is a channel that is transmitted periodically. That is, the measurement resource is transmitted periodically by a broadcast. In the procedure example 1-1, even after step S302, transmission of the measurement resource is continuously performed.

The remote UE2 that receives a measurement resource from each UE1 measures reception quality (RSRP, RSRQ and the like) of each UE1, and selects a UE1 of the best reception quality as a relay UE, for example. In the example of FIG. 13, the UE1C is selected as a relay UE.

In step S304, the remote UE2 transmits a relay request of L3 including an L2 address of the UE1C as a destination address to the UE1C by a PSCCH/PSSCH. That is, in L2, the relay request is transmitted by a unicast. The relay request includes information for requesting assignment of an IP address in L3. For example, the relay request includes an RS of IPv6.

The UE1C that receives the relay request returns a response of L3 to the remote UE2 by a PSCCH/PSSCH (step S305). The response includes an L2 address of the remote UE2 as a destination. Also, the response includes, for example, an RA (IPv6 prefix) of IPv6 as assignment information of an IP address. Accordingly, the remote UE2 is assigned an IP address (step S306), so that communication with a PDN becomes available via a relay UE.

In the procedure example 1-1, dynamic communication with the eNB10 side is unnecessary. Also, since the measurement resource is periodically transmitted, each remote UE can continue to check state of connection with a relay UE.

Procedure Example 1-2

Figure 14:
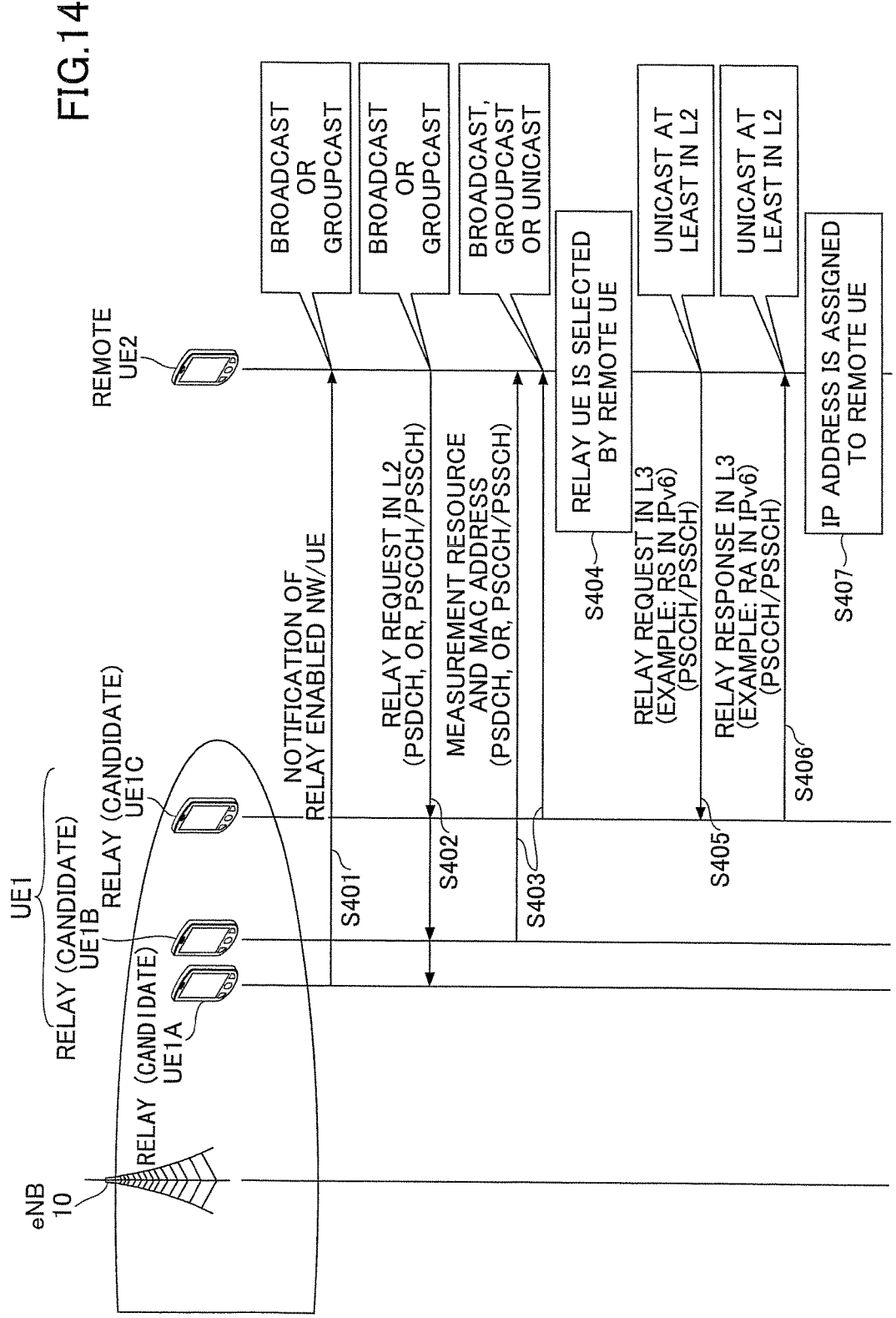
FIG. 14 is a diagram showing a procedure example 1-2 for relay UE selection.

Next, the procedure example 1-2 is described with reference to FIG. 14. First, the UE1 transmits a relay enabled notification by a broadcast or a groupcast (step S401). When using the groupcast, a group ID to be used for this notification is preconfigured in the terminal, or the group ID is notified explicitly or implicitly by a PSSS/SSSS and a PSBCH. The notification may include, for example, configuration information of a resource of a relay request to be transmitted from the remote UE2 after that, and configuration information of a measurement resource to be transmitted from the UE1 side. An L2 address of the remote UE2 of the transmission source may be included. Accordingly, unicast becomes available in step S402.

In step S402, the remote UE2 transmits a relay request in L2 by using a PSDCH or a PSCCH/PSSCH by any one of a broadcast, a groupcast, and a unicast. The relay request includes an L2 address of the remote UE2 of the transmission source.

In step S402, each UE1 that receives the relay request transmitted from the remote UE2 performs measurement. For example, a UE1 (the UE1B and the UE1C in the example of FIG. 14) that received the relay request with reception quality (RSRP, RSRQ) equal to or greater than a threshold transmits a measurement resource and a MAC address (L2 address) of the UE1 itself by a PSDCH by any one of a broadcast, a groupcast, and a unicast (step S403). That is, in the procedure example 1-2, since the UE1 transmits a measurement resource according to a request (on demand) from the remote UE2, periodic D2D transmission by the in-coverage UE can be made minimum.

The remote UE2 that receives measurement resource from the UE1B and the UE1C measures reception quality (RSRP, RSRQ and the like) of each UE1, and selects a UE1 of the best reception quality as a relay UE, for example (step S404). In the example FIG. 14, the UE1C is selected as a relay UE.

In step S405, the remote UE2 transmits a relay request of L3 including an L2 address of the UE1C as a destination address to the UE1C by a PSCCH/PSSCH. That is, in L2, the relay request is transmitted by a unicast. The relay request includes information for requesting assignment of an IP address in L3. For example, the relay request includes an RS of IPv6.

The UE1C that receives the relay request returns a response of L3 to the remote UE2 by a PSCCH/PSSCH (step S406). The response includes an L2 address of the remote UE2 as a destination. Also, the response includes, for example, an RA (IPv6 prefix) of IPv6 as assignment information of an IP address. Accordingly, the remote UE2 is assigned an IP address (step S407), so that communication with a PDN becomes available via a relay UE1C.

(Discovery Message in the Procedure Example 1)

In the preset embodiment, as a Discovery message (FIG. 5), a message including the following information is used.

A new message type is introduced in the field of "Message type" of the Discovery message such that the Discovery message can be distinguished from an existing discovery message. For example, a message type indicating that the message is a measurement resource for relay UE selection is introduced.

An L2 address (example: 24 bits or 48 bits or 64 bits) of a transmission source UE (example: relay UE) is included in other parts such as "ProSe Application Code" and the like. Also, an L2 address of transmission destination (example: remote UE, groupcast, or broadcast) or a part of the L2 address may be included. By including the L2 address of the transmission destination, the relay UE can provide limited UEs with a measurement resource.

When signaling for the before-mentioned control information for D2D relay is not supported, a resource pool configuration of communication for upper layer operation may be included in the part of the ProSe Application Code and the like. For example, a resource pool for transmission and reception, resource assignment option and the like may be included. Also, UE capability information (Capability) of a relay UE may be included in the part of the ProSe Application Code and the like. It becomes possible that the remote UE determines whether a desired relay can be provided from the relay UE based on the UE capability information.

When the payload amount becomes large due to the above-mentioned information or the like, fields of "MIC" and "Time Counter" of the Discovery message can be also utilized.

Procedure Example 2-1

Next, the procedure example 2-1 is described with reference to FIG. 15. First, the UE1 transmits a relay enabled notification by a broadcast or a groupcast (step S501). When using the groupcast, a group ID to be used for this notification is preconfigured in the terminal, or the group ID is notified explicitly or implicitly by a PSSS/SSSS and a PSBCH. The notification may include, for example, configuration information of a resource of a relay request to be transmitted from the remote UE2 after that, and configuration information of a measurement resource to be transmitted from the UE1 side.

In step S502, the remote UE2 transmits a relay request in L3 by using a PSCCH/PSSCH by a broadcast or a groupcast.

Each UE1 that receives a relay request transmitted from the remote UE2 in step S502 performs measurement and the like of a signal (DM-RS) of the relay request, and transmits a measurement report to the eNB10 (step S503). The measurement report includes, for example, quality of an access link (reception quality of a signal from the remote UE2) and quality of a backhaul link (reception quality of a signal from the eNB10).

The eNB10 selects a UE that becomes a relay for the remote UE2 based on the measurement report received from each UE1 in step S503 (step S504). The eNB10 selects, as the relay UE, a UE1 for which quality of the access link is equal to or greater than a predetermined threshold and quality of the backhaul link is equal to or greater than a predetermined threshold, for example. In the example of FIG. 15, the UE1C is selected as a relay UE.

The eNB10 transmits, to the UE1C, information indicating that the UE1C has been selected as a relay for the remote UE2 (step S505).

In step S506, the UE1C returns a response of L3 to the remote UE2 by a PSCCH/PSSCH. The response includes an L2 address of the remote UE2 as a destination. Also, the response includes, for example, an RA (IPv6 prefix) of IPv6 as assignment information of an IP address. Accordingly, the remote UE2 is assigned an IP address (step S507), so that communication with a PDN becomes available via a relay UE1C.

As described above, in the procedure example 2-1, the relay UE (UE1C) does not return a response of L3 to the remote UE2 until receiving an instruction from the eNB10.

In the procedure example 2-1, since the eNB10 performs relay UE selection, signaling between the relay UE and the remote UE can be made minimum. Also, since relay UE selection can be performed by considering both of the access link and the backhaul link, the best balance between the access link and the backhaul link can be realized. Also, in the procedure example 2-1, since the eNB10 can ascertain a relay candidate UE having a good access link with the remote UE, UEs of relay candidates can be limited. For example, a relay candidate UE that does not have a good access link with the remote UE can be deactivated.

Procedure Example 2-2

Next, the procedure example 2-2 is described with reference to FIG. 16. First, the UE1 transmits a relay enabled notification by a broadcast or a groupcast (step S601). When using the groupcast, a group ID to be used for this notification is preconfigured in the terminal, or the group ID is notified explicitly or implicitly by a PSSS/SSSS and a PSBCH. The notification may include, for example, configuration information of a resource of a relay request to be transmitted from the remote UE2 after that, and configuration information of a measurement resource to be transmitted from the UE1 side.

In step S602, the remote UE2 transmits a relay request in L3 by using a PSCCH/PSSCH by a broadcast or a groupcast. The relay request includes, for example, an RS of IPv6 as information for requesting assignment of an IP address.

Each UE1 that receives a relay request transmitted from the remote UE2 in step S602 performs measurement, so that, for example, a UE1 (the UE1B and the UE1C in the example of FIG. 16) that received the relay request with reception quality (RSRP, RSRQ) equal to or greater than a threshold returns a measurement resource and a response of L3 (example: RA of IPv6) to the remote UE2 by a PSCCH/PSSCH (step S603). The response includes an L2 address of the remote UE2 as a destination.

In the measurement in the UE1, if the quality of the detected signal is lower than a threshold, the UE1 does not return a response. The threshold may be configured from the eNB10, or may be preconfigure.

The remote UE2 that received the measurement resource from the UE1B and the UE1C measures reception quality (RSRP, RSRQ and the like) of each UE1, and for example, selects a UE1 of the best reception quality as a relay UE (step S604). By not returning a response to UEs other than that, assignment of a plurality of IP addresses is avoided. Accordingly, the remote UE2 is assigned an IP address based on information received from the selected UE1 (step S605), so that it becomes possible that the remote UE2 communicates with a PDN via the selected relay UE.

In the procedure example 2-2, communication between a relay UE and a remote UE can be reduced. Also, dynamic communication with the eNB10 is unnecessary.

(On Measurement Resource, L2 Address and the Like in the Procedure Example 2)

In the procedure example 2, a DM-RS in a PSSCH or a PSSCH is used for measurement. Also, in the above-mentioned example, the remote UE2 transmits a relay request by a broadcast or a groupcast. By transmitting a relay request by a groupcast, it can be avoided that a UE that is not a relay candidate receives a relay request. Accordingly, battery consumption can be decreased. A group destination ID for groupcast may be transmitted, for example, by a relay enabled notification, or the group destination ID may be pre-configured.

FIGS. 17A and 17B are tables collectively showing L2 addresses (ID) included in a relay request and a relay response. As shown in FIG. 17A, an L2 transmission source ID of a request transmitted from a remote UE is the remote UE, and an L2 destination ID of the request is broadcast or groupcast. As shown in FIG. 17B, an L2 transmission source ID of a response transmitted from a relay UE is the relay UE, and an L2 destination ID of the response is the remote UE.

(Reduction of Complexity and Battery Consumption in the Procedure Example 2)

In the above-mentioned procedure example 2-1, the relay UE needs to measure all resources of communication that can be measured. Also, in the procedure example 2-1 and 2-2, the remote UE needs to measure all resources of communication that can be measured. Given this situation, in the procedure example 2, there is a possibility in that complexity and battery consumption increase. Therefore, processing may be performed as explained in the modified example 1 and the modified example 2 as follows. Note that each of the following modified examples can be also applied to the procedure example 1.

Modified Example 1

In the modified example 1, measurement is performed being triggered by an instruction of an SCI (Sidelink control information). The SCI is control information transmitted by a PSCCH. That is, for example, in the procedure example 2-1, the relay UE performs measurement of the PSCCH or PSSCH only when the SCI received from the remote UE indicates a measurement instruction. Also, in the procedure examples 2-1 and 2-2, the remote UE performs measurement of the PSCCH or PSSCH only when the SCI received from the relay UE indicates a measurement instruction.

For enabling the above-mentioned processing, a new SCI is defined. By the new SCI, it can be determined whether measurement is necessary for data. Only when detecting the SCI, the UE executes measurement for relay UE selection. A measurement resource in this case is, for example, a DM-RS of the associated PSSCH. In the new SCI, for example, a predetermined bit in the SCI is set to be a predetermined value.

According to the modified example 1, since the UE does not need to perform measurement unless receiving a special SCI, battery consumption associated with measurement can be reduced.

Modified Example 2

In the modified example 2, the period of PSCCH that enables measurement is restricted. That is, for example, measurement is performed on a PSCCH with a period longer than a period with which a PSCCH resource pool arrives. That is, as for the relay UE, a period of the PSCCH that becomes a measurement target is notified by a signaling from an upper layer (eNB10). The period may be preconfigured. Also, as for the remote UE, a period of the PSCCH that becomes a measurement target is notified by a signaling from a relay UE. The period may be preconfigured. For example, after the remote UE transmits a relay request, the remote UE performs measurement from a next measurement target PSCCH period.

<Out-of-Coverage PSDCH Transmission>

In the above-mentioned examples, operation in which an in-coverage UE transmits a signal to an out-of-coverage UE using a PSDCH, or the reverse is performed. However, the conventional PSDCH does not support transmission of a synchronization signal to an out-of-coverage UE, and does not support PSDCH transmission of an out-of-coverage UE. Therefore, a synchronization signal (PSSS/SSSS and PSBCH) may be transmitted between terminals such that synchronization can be established between UEs of in-coverage and out-of-coverage, and between UEs of out-of-coverage. The following synchronization signal transmission can be applied not only to D2D relay but also to PSDCH transmission of out-of-coverage (in-coverage).

For example, the UE may transmit the synchronization signal periodically (for example, period of 40 ms), or the UE may transmit the synchronization signal by using, from among subframes for synchronization signal transmission defined periodically, a subframe in a PSDCH resource pool, or a subframe of the top of the PSDCH resource pool, or a subframe, before the PSDCH resource pool, closest to the PSDCH resource pool. For enhancing synchronization accuracy, a synchronization signal may be transmitted in several periods of synchronization signal transmission before a PDSCH resource pool. Also, for reducing overhead, a synchronization signal transmission time range in the resource pool may be restricted. The time range may be predetermined, or it is preconfigured in the terminal, or it may be transmitted to an in-coverage UE from the base station by an upper layer signaling (including broadcast signaling).

(Configuration Example of User Apparatus)

Figure 18:
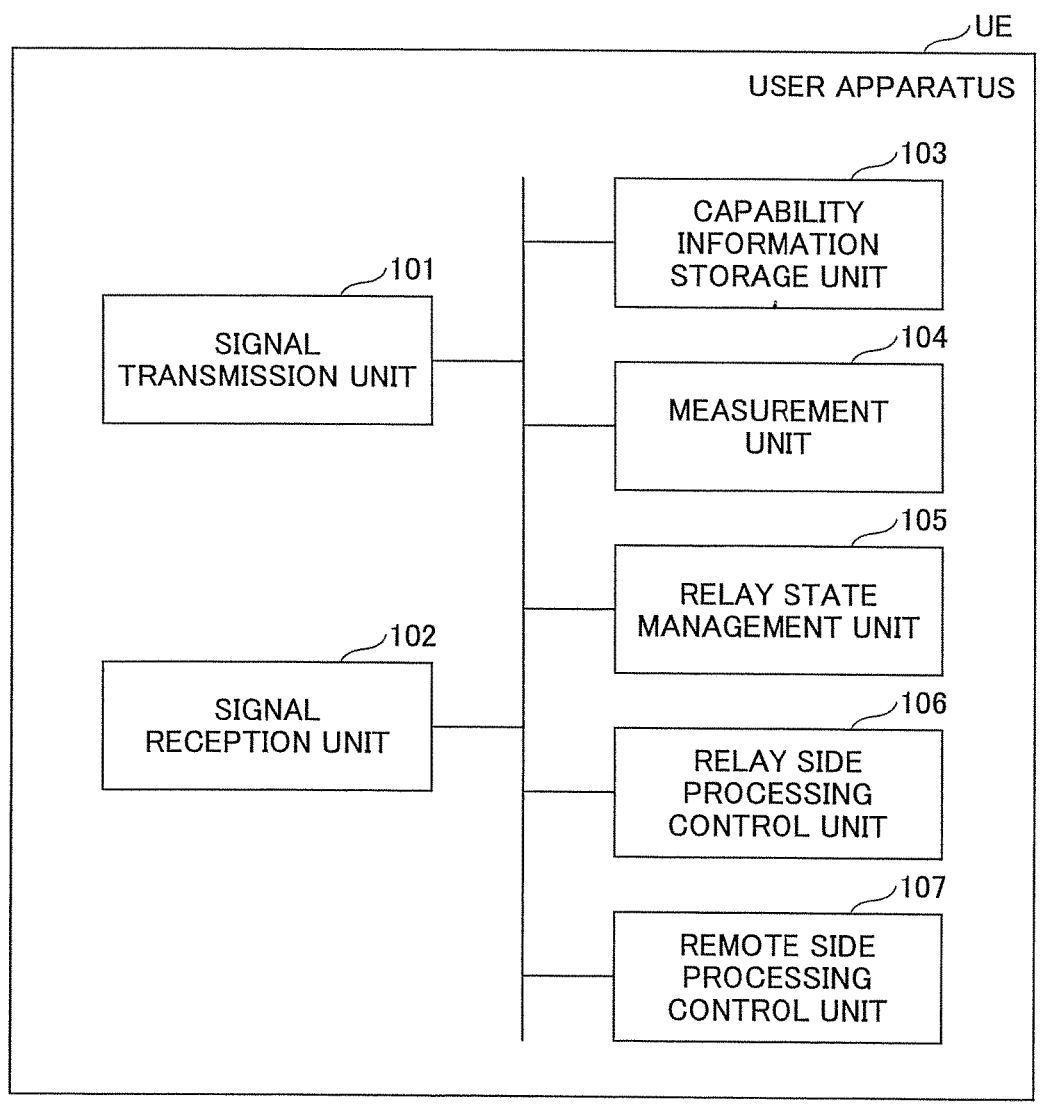
FIG. 18 is a block diagram of a user apparatus UE in an embodiment of the present invention.

FIG. 18 shows a functional block diagram of a UE according to the present embodiment. The UE shown in FIG. 18 is a UE that can become any of a relay UE and a remote UE described in the present embodiment. However, for example, the UE may be provided with only functions of the relay UE or only functions of the remote UE.

As shown in FIG. 18, the UE includes a signal transmission unit 101 (transmitter), a signal reception unit 102 (receiver), a capability information storage unit 103, a measurement unit 104, a relay state management unit 105, a relay side processing control unit 106 and a remote side processing control unit 107. FIG. 18 only shows functional units especially related to the embodiment of the present invention in the user apparatus UE, and the user apparatus UE also includes at least functions, not shown in the figure, for performing operation complying with LTE. Also, the configuration shown in FIG. 18 is merely an example. Any functional segmentations and any names of functional units can be used as long as the UE can execute operation described in the present embodiment.

The signal transmission unit 101 includes functions configured to generate various signals of physical layer from an upper layer signal to be transmitted from the UE, and transmit the signals by radio. The signal transmission unit 101 includes a transmission function of D2D communication and a transmission function of cellular communication.

The signal reception unit 102 includes functions configured to receive various signals from another UE or the eNB by radio and obtain a signal of an upper layer from the received physical layer signals. The signal reception unit 102 includes a reception function of D2D communication and a reception function of cellular communication.

The capability information storage unit 103 stores capability information including capability information indicating whether the UE has a capability to become a relay UE, and the capability information can be transmitted to the eNB from the signal transmission unit 101.

The measurement unit 104 includes a function configured to obtain information of reception quality (RSRP, RSRQ and the like) by performing measurement of a reception signal (example: DM-RS). The measurement unit 104 includes functions for performing both of measurement as a remote UE and measurement as a relay (candidate) UE described in the present embodiment. Also, as to the measurement, both of measurement of an access link and measurement of a backhaul link can be performed.

Also, the measurement unit 104 includes a function configured to detect a neighbor activated UE by measuring a signal from the neighbor activated UE.

The relay state management unit 105 manages (stores) information indicating whether a UE is activated as a relay candidate. For example, when receiving an activation instruction from the eNB, the UE stores information indicating that the UE has been activated. This corresponds to activation of the UE. By being activated, the UE performs operation as a relay candidate, such as transmission of a measurement resource or reception of a response or the like. Also, the relay state management unit 105 includes a function configured, when a predetermined condition (example: quality of backhaul link) for continuing activation is not satisfied, to deactivate the UE.

The relay side processing control unit 106 performs relay processing of data communication, and performs control of operation of the UE in the side of relay described so far. For example, the relay side processing control unit 106 performs, via the signal transmission unit 101, transmission of relay enabled notification, transmission of measurement resource and the like, transmission of control information for D2D relay, and the like, and also includes a function configured to obtain an address from a PDN and to return information of an address according to a request from a remote UE.

The remote side processing control unit 107 performs control of operation of the UE in the side of a remote UE described so far. For example, the remote side processing control unit 107 includes functions configured to perform selection of a relay UE based on a measurement result, transmission of a relay request, reception of a relay response, data communication using relay, and the like.

The configuration of the user apparatus UE shown in FIG. 18 may be realized by hardware circuits (example: one or a plurality of IC chips) as a whole, or may be realized by hardware circuits for a part and by a CPU and a program for other parts.

Figure 19:
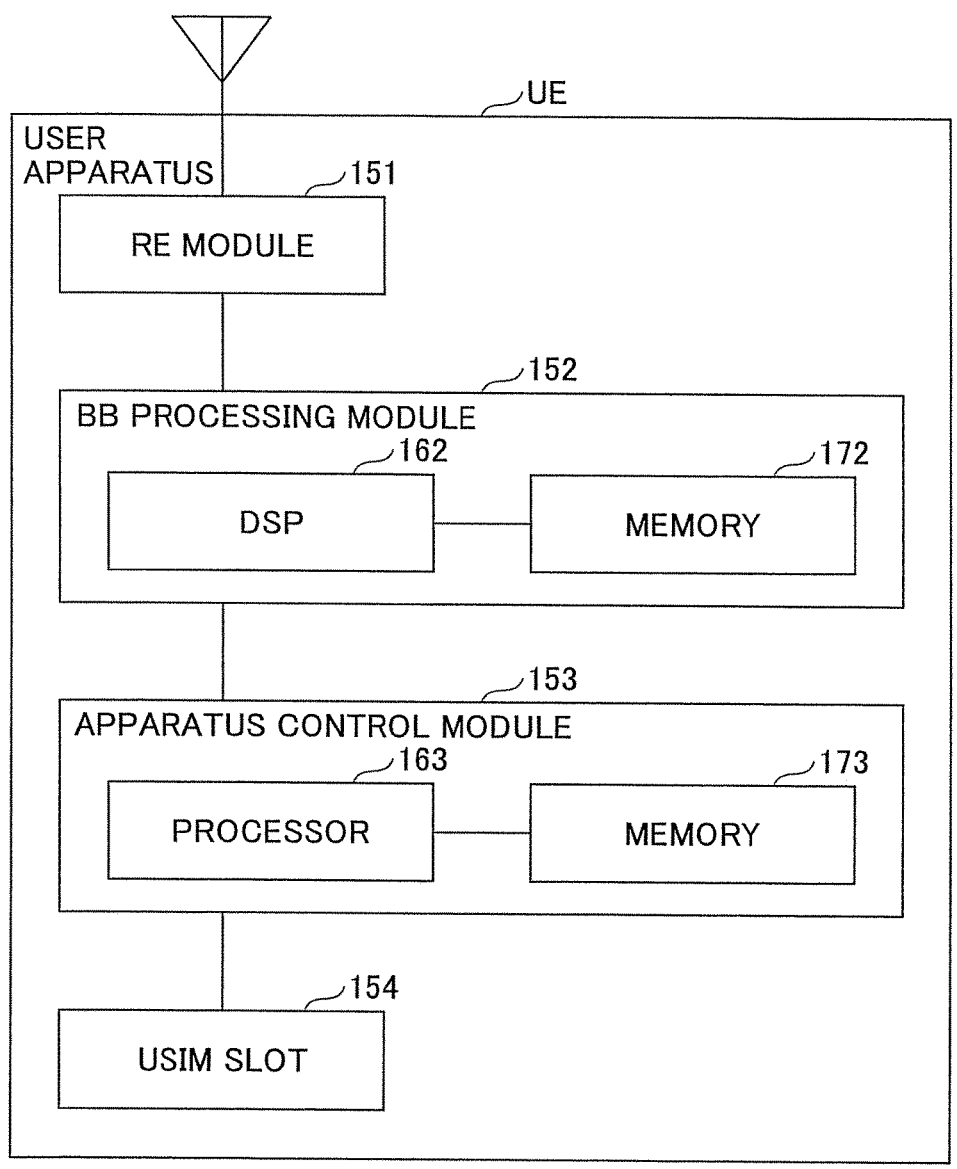
FIG. 19 is a HW block diagram of a user apparatus UE.

FIG. 19 is a diagram showing an example of a hardware (HW) configuration of the user apparatus UE. FIG. 19 shows a configuration closer to an implementation example than FIG. 18. As shown in FIG. 19, the UE includes an RE (Radio Equipment) module 151 for performing processing on radio signals, a BB (Base Band) processing module 152 for performing baseband signal processing, an apparatus control module 153 for performing processes of upper layer and the like, and a USIM slot 154 that is an interface for accessing a USIM card.

The RE module 151 generates a radio signal that should be transmitted from an antenna by performing D/A (Digital-to-Analog) conversion, modulation, frequency conversion, and power amplifying and the like on a digital baseband signal received from the BB processing module 152. Also, the RE module 151 generates a digital baseband signal by performing frequency conversion, A/D (Analog to Digital) conversion, demodulation and the like on a received radio signal, so as to pass the signal to the BB processing module 152. The RE module 151 includes, for example, functions of physical layer and the like of the signal transmission unit 101 and the signal reception unit 102 of FIG. 18.

The BB processing module 152 performs processing for converting between IP packets and digital baseband signals. The DSP (Digital Signal Processor) 162 is a processor for performing signal processing in the BB processing module 152. The memory 172 is used as a work area of the DSP 162. The BB processing module 152 may include, for example, functions of layer 2 and the like of the signal transmission unit 101 and the signal reception unit 102 of FIG. 18, and include the capability information storage unit 103, the measurement unit 104, the relay state management unit 105, the relay side processing control unit 106 and the remote side processing control unit 107. Note that all or a part of functions of the capability information storage unit 103, the measurement unit 104, the relay state management unit 105, the relay side processing control unit 106 and the remote side processing control unit 107 may be included in the apparatus control module 153.

The apparatus control module 153 performs protocol processing of IP layer, processing of various applications, and the like. The processor 163 is a processor for performing processes performed by the apparatus control module 153. The memory 173 is used as a work area of the processor 163. The processor 163 performs read and write of data with a USIM via the USIM slot 154.

(Configuration Example of Base Station eNB)

Figure 20:
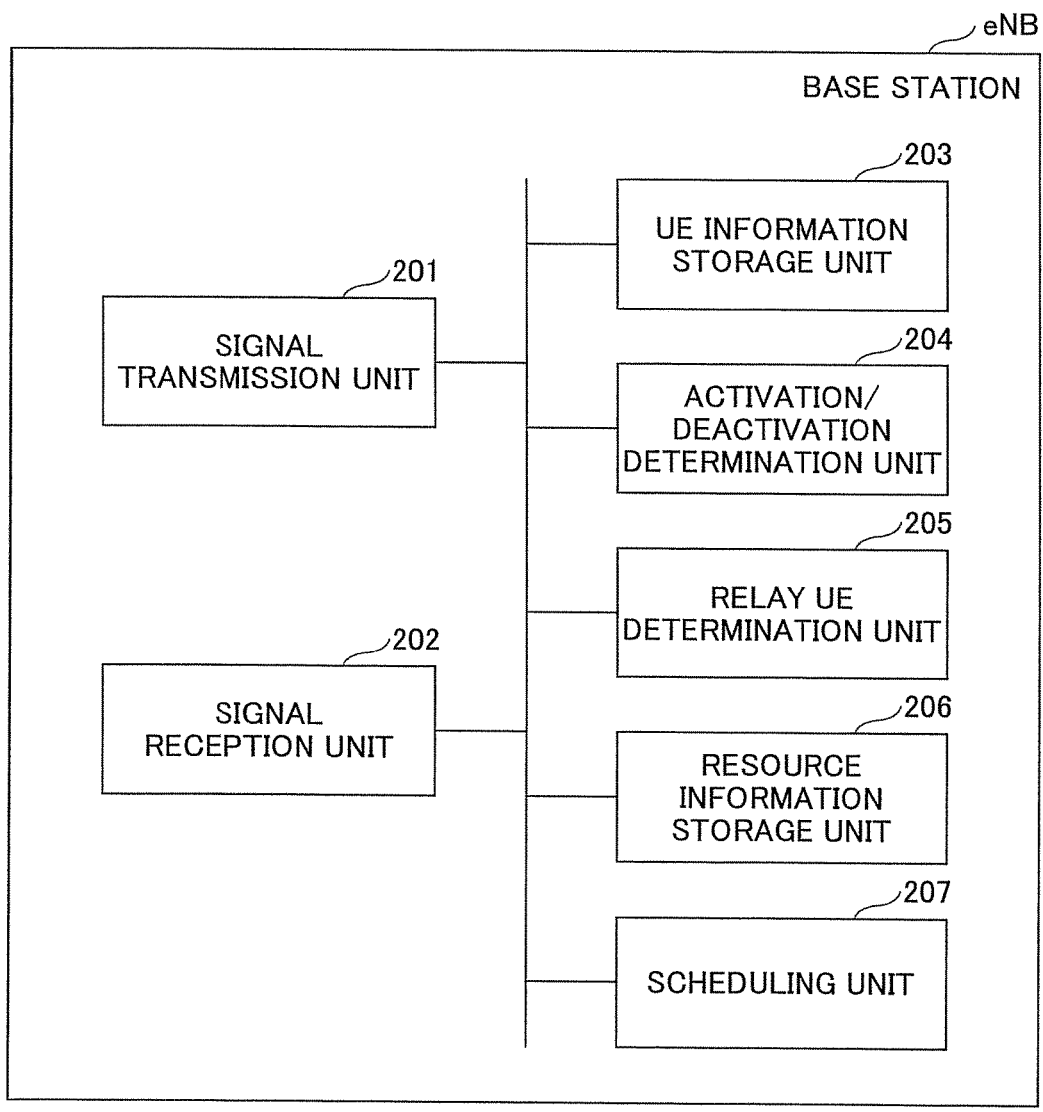
FIG. 20 is a block diagram of a base station eNB in an embodiment of the present invention.

FIG. 20 shows a functional block diagram of the eNB according to the present embodiment. As shown in FIG. 20, the eNB includes a signal transmission unit 201, a signal reception unit 202, a UE information storage unit 203, an activation/deactivation determination unit 204, a relay UE determination unit 205, a resource information storage unit 206, and a scheduling unit 207. FIG. 20 only shows functional units especially related to the embodiment of the present invention in the eNB, and the eNB also includes at least functions, not shown in the figure, for performing operation complying with LTE. Also, the configuration shown in FIG. 20 is merely an example. Any functional segmentations and any names of functional units can be used as long as the eNB can execute operation described in the present embodiment.

The signal transmission unit 201 includes functions configured to generate various signals of physical layer from an upper layer signal to be transmitted from the eNB, and transmit the signals by radio. The signal reception unit 202 includes functions configured to receive various signals from the UE by radio and obtain a signal of an upper layer from the received physical layer signals.

The UE information storage unit 203 stores, for each UE, information of UE capability received from each UE, measurement report, state information of activation/deactivation, and the like. The activation/deactivation determination unit 204 includes a function configured to activate/deactivate a UE based on information stored in the UE information storage unit 203, and to notify the UE of an activation instruction and the like.

The relay UE determination unit 205 performs processing, as shown in FIG. 15, for determining a relay UE in the eNB side, and to notify of it.

The resource information storage unit 206 stores, for each UE, information indicating assigned D2D resources, and the like. When a resource is released, assigned information is deleted. The scheduling unit 207 includes a function configured to perform resource assignment. Also, the scheduling unit 207 includes a function configured to determine configuration information of a resource to be included in a PSBCH or control information for D2D relay by a relay UE, and the like, and to notify the UE of it via the signal transmission unit 201.

The configuration of the base station eNB shown in FIG. 20 may be realized by hardware circuits (example: one or a plurality of IC chips) as a whole, or may be realized by hardware circuits for a part and by a CPU and a program for other parts.

Figure 21:
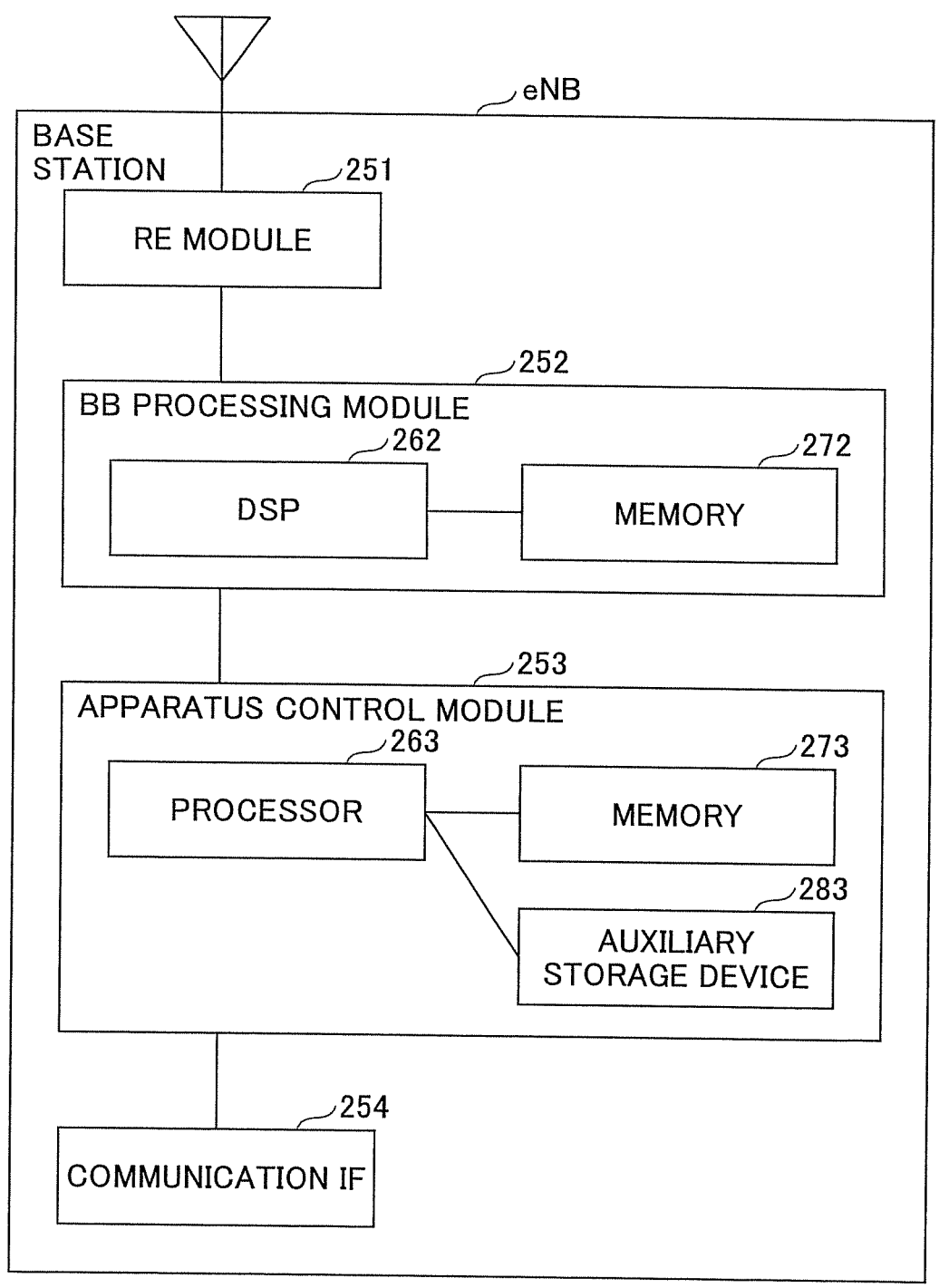
FIG. 21 is a HW block diagram of a base station eNB.

FIG. 21 is a diagram showing an example of a hardware (HW) configuration of the base station eNB. FIG. 21 shows a configuration closer to an implementation example than FIG. 20. As shown in FIG. 21, the base station eNB includes an RE module 251 for performing processing on radio signals, a BB processing module 252 for performing baseband signal processing, an apparatus control module 253 for performing processes of upper layer and the like, and a communication IF 254 that is an interface for connecting to a network.

The RE module 251 generates a radio signal that should be transmitted from an antenna by performing D/A conversion, modulation, frequency conversion, and power amplifying and the like on a digital baseband signal received form the BB processing module 252. Also, the RE module 251 generates a digital baseband signal by performing frequency conversion, A/D conversion, demodulation and the like on a received radio signal, so as to pass the signal to the BB processing module 252. The RE module 251 includes, for example, functions of physical layer and the like of the signal transmission unit 201 and the signal reception unit 202 of FIG. 20.

The BB processing module 252 performs processing for converting between IP packets and digital baseband signals. The DSP 262 is a processor for performing signal processing in the BB processing module 252. The memory 272 is used as a work area of the DSP 262. The BB processing module 252 may include, for example, functions of layer 2 and the like of the signal transmission unit 201 and the signal reception unit 202 of FIG. 20, and include the UE information storage unit 203, the activation/deactivation determination unit 204, the relay UE determination unit 205, the resource information storage unit 206, and the scheduling unit 207. All of or a part of functions of the UE information storage unit 203, the activation/deactivation determination unit 204, the relay UE determination unit 205, the resource information storage unit 206, and the scheduling unit 207 may be included in the apparatus control module 252.

The apparatus control module 253 performs protocol processing of IP layer, OAM processing, and the like. The processor 263 is a processor for performing processes performed by the apparatus control module 253. The memory 273 is used as a work area of the processor 263. The auxiliary storage device 283 is, for example, an HDD and the like, and stores various setting information and the like for operation of the base station eNB.

As described above, according to the present embodiment, there is provided a user apparatus for use in a mobile communication system that supports D2D communication, including:

a transmission unit configured to, when the user apparatus is located in-coverage of a base station, transmit a relay enabled notification indicating that the user apparatus is able to become a relay apparatus that relays data communication between a remote user apparatus and the base station; and a state control unit configured to activate the user apparatus as a candidate of the relay apparatus in response to receiving an activation instruction from the base station.

Note that, the above-mentioned "remote user apparatus" is, for example, a user apparatus, out-of-coverage, that cannot receive synchronization signal/broadcast information of the base station, a user apparatus that uses a synchronization signal transmitted by a terminal as a synchronization source, or a user apparatus that cannot connect to a network because RRC connection cannot be completed, or the like. That is, the remote user apparatus is not limited to an out-of-coverage user apparatus. Also, a user apparatus "becoming a relay apparatus" is, for example, that the user apparatus performs necessary operation for relaying after the user apparatus is authenticated as a relay apparatus, after the user apparatus is instructed to operate as a relay apparatus from a base station, or after the user apparatus autonomously determines to perform relay operation.

According to the above-mentioned configuration, it becomes possible to efficiently realize D2D relay communication in which an in-coverage user apparatus relays data communication between a user apparatus and a base station.

The transmission unit can be configured to, after the user apparatus is activated as a candidate of the relay apparatus, transmit, to the remote user apparatus, a measurement resource to be used for selecting a relay apparatus from among candidates of relay apparatuses. According to this configuration, it can be avoided that a user apparatus that is not activated (that cannot properly perform relay) is selected as a relay apparatus.

The relay enabled notification includes, for example, configuration information of a channel for transmitting the measurement resource. According to this configuration, the remote user apparatus can properly receive a measurement resource to perform measurement.

The relay enabled notification may include configuration information of a channel for the remote user apparatus to receive control information for D2D relay, and the transmission unit may be configured to transmit the control information for D2D relay after transmitting the relay enabled notification. According to this configuration, the remote user apparatus can properly receive control information for D2D relay.

The control information for D2D relay includes, for example, configuration information of a channel for transmitting a measurement resource that is used for selecting a relay apparatus from among candidates of relay apparatuses. According to this configuration, the remote user apparatus can properly receive a measurement resource, and perform measurement.

The user apparatus may include a detection unit configured to detect a neighbor user apparatus based on a signal transmitted from the neighbor user apparatus that has been activated as a candidate of a relay apparatus. The transmission unit may be configured to transmit, to the base station, information of the neighbor user apparatus detected by the detection unit as a measurement report. According to this configuration, the base station can determine activation/deactivation in consideration of a neighbor user apparatus activated as a candidate of a relay apparatus.

In a case where the user apparatus is activated as a candidate of the relay apparatus, the state control unit may autonomously deactivate the user apparatus when a predetermined condition is satisfied. According to this configuration, a user apparatus that is not suitable for a candidate of a relay apparatus can be deactivated.

Also, according to the present embodiment, there is provided a base station that communicates with a user apparatus in a mobile communication system supporting D2D communication, including:

a reception unit configured to receive, from the user apparatus, capability information indicating whether the user apparatus has a capability for becoming a relay apparatus that relays data communication between a remote user apparatus and the base station; and a determination unit configured to determine whether to activate the user apparatus as a candidate of the relay apparatus based on the capability information, and, when activating the user apparatus as the candidate of the relay apparatus, to transmit an activation instruction to the user apparatus.

According to the above configuration, it becomes possible to efficiently realize D2D relay communication in which an in-coverage user apparatus relays data communication between a user apparatus and a base station.

The reception unit is configured to receive, from the user apparatus, information of a neighbor user apparatus that has been activated as a candidate of a relay apparatus as a measurement report, and the determination unit can be configured to determine whether to activate the user apparatus as the candidate of the relay apparatus based on the capability information and the measurement report. According to the this configuration, a user apparatus that is proper for a candidate of a relay apparatus can be activated.

Also, according to the present embodiment, there is provided a user apparatus that is used in a mobile communication system that supports D2D communication, and that includes a capability for becoming a relay apparatus for relaying data communication between a remote user apparatus and a base station, including:

a transmission unit configured to transmit a measurement resource that is used for the remote user apparatus to select a relay apparatus from among candidates of relay apparatuses, and a layer 2 address of the user apparatus; and a response unit configured to receive, from the remote user apparatus, an assignment request of an address for data communication by the relay, and to transmit information of the address to the remote user apparatus.

According to the above configuration, it becomes possible to efficiently realize D2D relay communication in which an in-coverage user apparatus relays data communication between a user apparatus and a base station.

The transmission unit is configured, for example, to transmit the measurement resource and the layer 2 address by using a D2D channel in which a periodic resource pool is configured. According to this configuration, for example, the remote user apparatus can continuously check connection with the relay apparatus.

The user apparatus may include a reception unit configured to receive a relay request from the remote user apparatus, and the transmission unit may be configured to transmit the measurement resource and the layer 2 address of the user apparatus in response to receiving the relay request by the reception unit. According to this configuration, since only a user apparatus that has received a relay request performs transmission of a measurement resource and the like, D2D transmission to the remote user apparatus can be reduced.

The transmission unit may be configured to transmit the measurement resource to the remote user apparatus by a unicast or a groupcast. According to this configuration, for example, the user apparatus can transmit a measurement resource and the like only to a remote user apparatus desired to be caused to perform measurement (desired to be caused to perform relay selection), or only to a specific group.

Also, according to the present embodiment, there is provided a user apparatus that is used in a mobile communication system supporting D2D communication, and that includes a capability for becoming a relay apparatus for relaying data communication between a remote user apparatus and a base station, including:

a reception unit configured to receive, from the remote user apparatus, a relay request including a layer 2 address of the remote user apparatus;

a measurement unit configured to measure reception quality of a channel used for transmission of the relay request, and to transmit the reception quality to the base station as a measurement report;

and a transmission unit configured to transmit, to the remote user apparatus, information of an address to be used for data communication by the relay in response to receiving information, from the base station, indicating that the user apparatus has been determined as a relay apparatus for the remote user apparatus.

According to the above configuration, it becomes possible to efficiently realize D2D relay communication in which an in-coverage user apparatus relays data communication between a user apparatus and a base station.

The measurement unit may be configured to measure quality of a link between the base station and the user apparatus, and to transmit a measurement report, to the base station, including the quality of the link and the reception quality. According to this configuration, the base station can determine a relay apparatus in consideration of both of a backhaul link and an access link.

Also, according to the present embodiment, there is provided a user apparatus that is used in a mobile communication system supporting D2D communication, and that includes a capability for becoming a relay apparatus for relaying data communication between a remote user apparatus and a base station, including:

a reception unit configured to receive, from the remote user apparatus, a relay request including a layer 2 address of the remote user apparatus and an assignment request of an address for data communication by the relay; and a transmission unit configured to transmit, to the remote user apparatus, a measurement resource that is used for the remote user apparatus to select a relay apparatus from among candidates of relay apparatuses, and information of an address used for data communication by the relay.

According to the above configuration, it becomes possible to efficiently realize D2D relay communication in which an in-coverage user apparatus relays data communication between a user apparatus and a base station.

The transmission unit may be configured to transmit the measurement resource to the remote user apparatus together with control information for instructing to perform measurement, or to transmit the measurement resource to the remote user apparatus in a time period that is predetermined as a time period for performing measurement. According to this configuration, the remote user apparatus can perform measurement only when measurement is instructed, so that it can be avoided to perform useless measurement processing.

Also, according to the present embodiment, there is provided a base station that performs, in a mobile communication system supporting D2D communication, communication with a user apparatus that includes a capability for becoming a relay apparatus for relaying data communication between a remote user apparatus and a base station, including:

a reception unit configured to receive, from the user apparatus that measures reception quality of a channel received from the remote user apparatus, the reception quality as a measurement report; and a determination unit configured to determine a user apparatus as a relay apparatus for the remote user apparatus based on the measurement report, and to transmit information indicating that the determination has been made to the user apparatus.

According to the above configuration, it becomes possible to efficiently realize D2D relay communication in which an in-coverage user apparatus relays data communication between a user apparatus and a base station.

The reception unit is configured to receive, from the user apparatus, a measurement report including quality of a link between the base station and the user apparatus, and the reception quality, and the determination unit is configured to determine a user apparatus as a relay apparatus for the remote user apparatus based on the measurement report. According to this configuration, the base station can determine a relay apparatus in consideration of both of a backhaul link and an access link.

The user apparatus UE described in the present embodiment may include a CPU and a memory, and may be realized by executing a program by the CPU (processor), or may be realized by hardware such as hardware circuits including logics of processing described in the embodiment, or may be configured by coexistence of a program and hardware.

The base station eNB described in the present embodiment may include a CPU and a memory, and may be realized by executing a program by the CPU (processor), or may be realized by hardware such as hardware circuits including logics of processing described in the embodiment, or may be configured by coexistence of a program and hardware.

In the above, the embodiment of the present invention has been explained. However, the disclosed invention is not limited to the embodiment. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus UE and the base station eNB have been explained by using functional block diagrams. However, such an apparatus may be implemented in hardware, software, or a combination thereof.

The software that operate by a processor of the user apparatus UE according to an embodiment of the present invention, and the software that operate by a processor of the base station eNB according to an embodiment of the present invention may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present patent application claims priority based on Japanese patent application No. 2015-074186, filed in the JPO on Mar. 31, 2015, and the entire contents of the Japanese patent application No. 2015-074186 are incorporated herein by reference.

DESCRIPTION OF REFERENCE SIGNS eNB base station
UE user apparatus
101 signal transmission unit
102 signal reception unit
103 capability information storage unit
104 measurement unit
105 relay state management unit
106 relay side processing control unit
107 remote side processing control unit
151 RE module
152 BB processing module 153 apparatus control module
154 USIM slot
201 signal transmission unit
202 signal reception unit
203 UE information storage unit
204 activation/deactivation determination unit
205 relay UE determination unit
206 resource information storage unit
207 scheduling unit
251 RE module
252 BB processing module
253 apparatus control module
254 communication IF

The invention claimed is:

1. A user apparatus that is used in a mobile communication system that supports device-to-device (D2D) communication, and that includes a capability for becoming a relay apparatus for relaying data communication between a remote user apparatus and a base station, comprising:
   a transmitter configured to transmit a message that is used for the remote user apparatus to select a first relay apparatus from among candidates of relay apparatuses, and that includes a layer 2 address of the user apparatus; and
   a processor configured to receive, from the remote user apparatus, an assignment request of an address for data communication by the first relay apparatus, and to transmit information of the address to the remote user apparatus,
   wherein the transmitter is configured to transmit the message to the remote user apparatus by a groupcast, and
   wherein the transmitter is configured to transmit the message by using a resource pool of sidelink in which resources are periodically allocated.

2. The user apparatus as claimed in claim 1, further comprising:
   a receiver configured to receive a relay request from the remote user apparatus,
   wherein the transmitter is configured to transmit the message in response to receiving the relay request by the receiver.

* * * * *